Aug. 11, 1931.  E. F. MAAS  1,818,955
METHOD OF AND APPARATUS FOR MANUFACTURING PNEUMATIC TIRES
Filed June 28, 1929  16 Sheets-Sheet 1
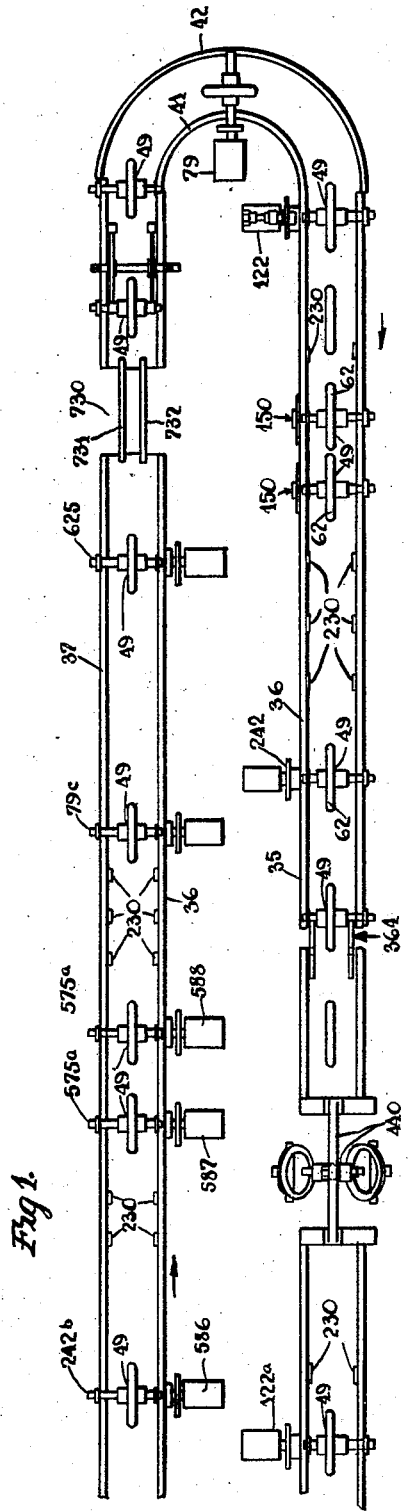
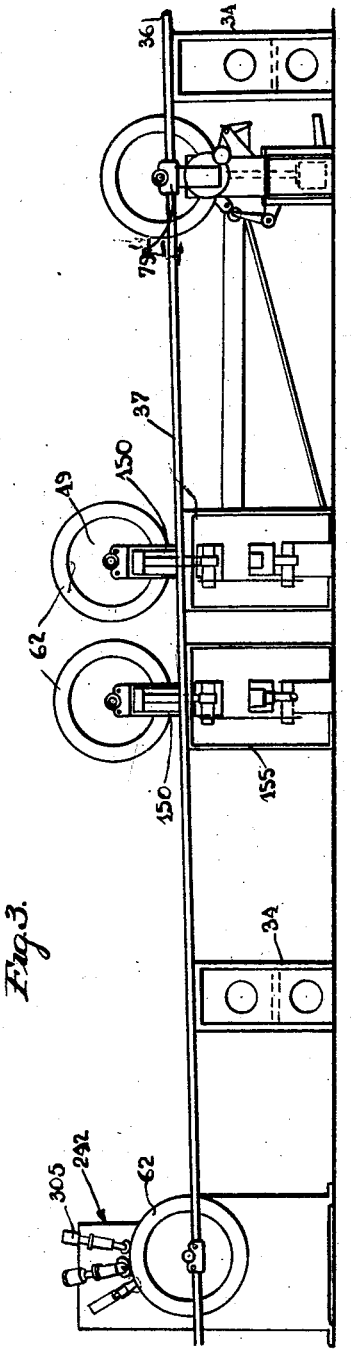
INVENTOR
Elov F. Maas.
BY
ATTORNEY

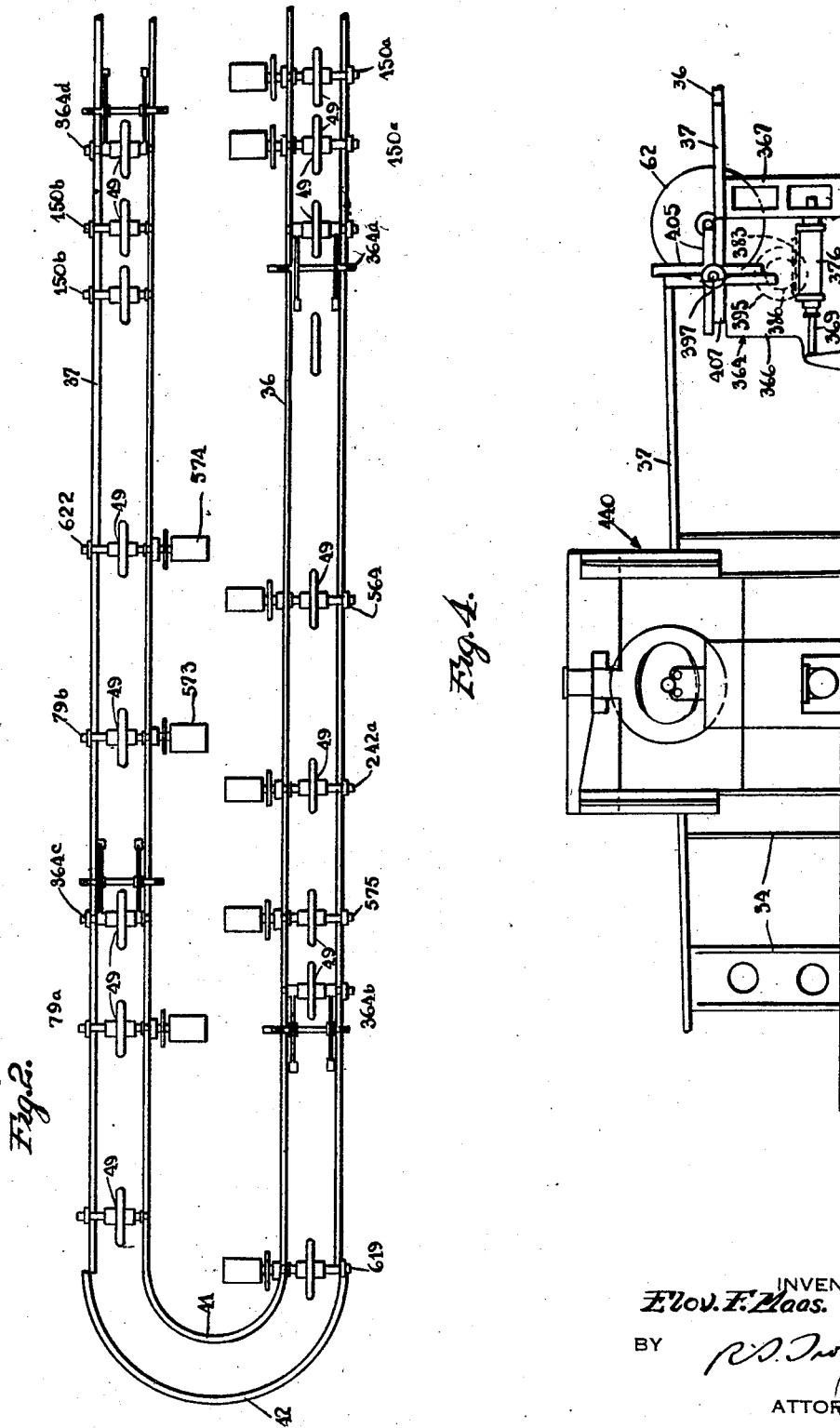

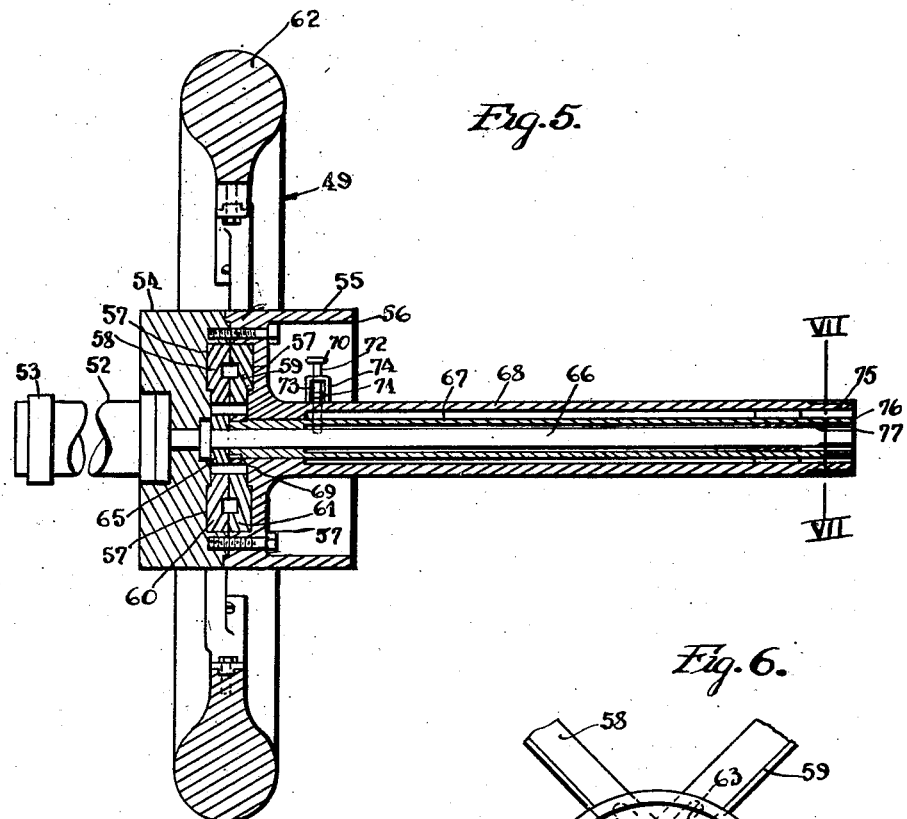
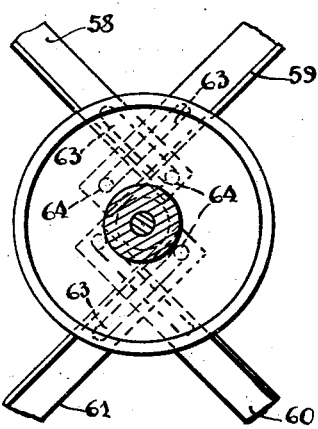
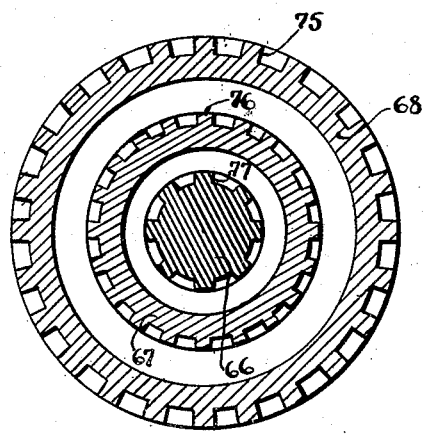

Aug. 11, 1931.  E. F. MAAS  1,818,955
METHOD OF AND APPARATUS FOR MANUFACTURING PNEUMATIC TIRES
Filed June 28, 1929  16 Sheets-Sheet 4
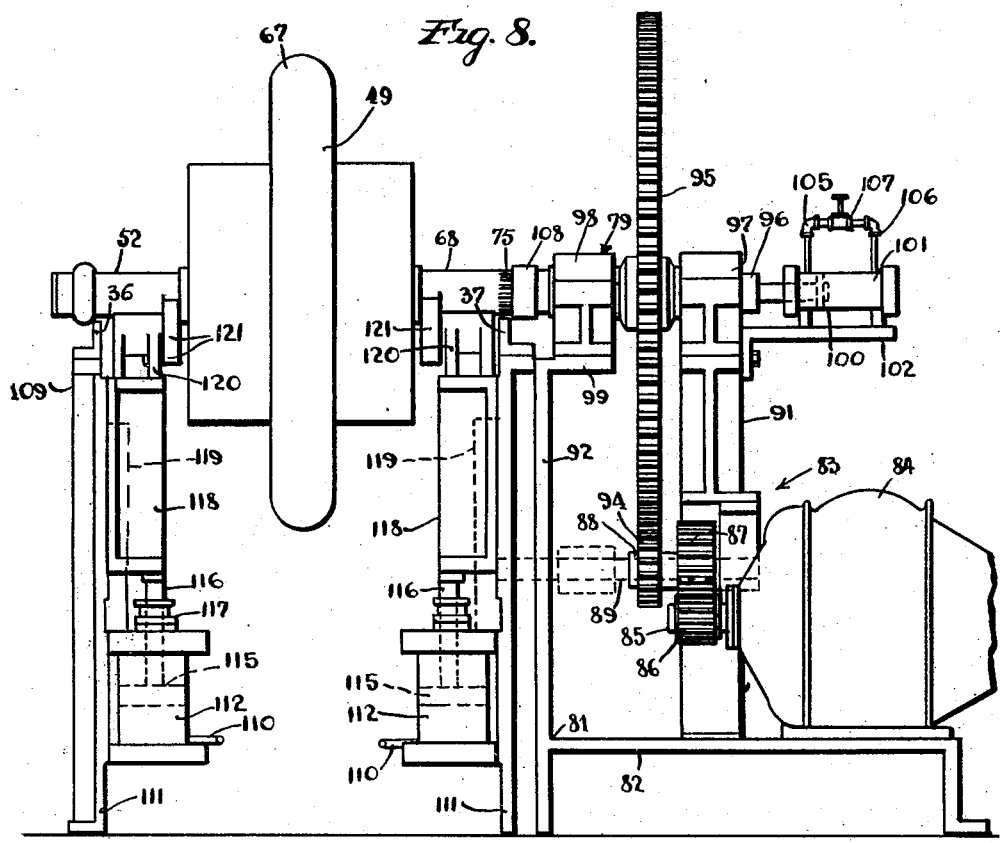
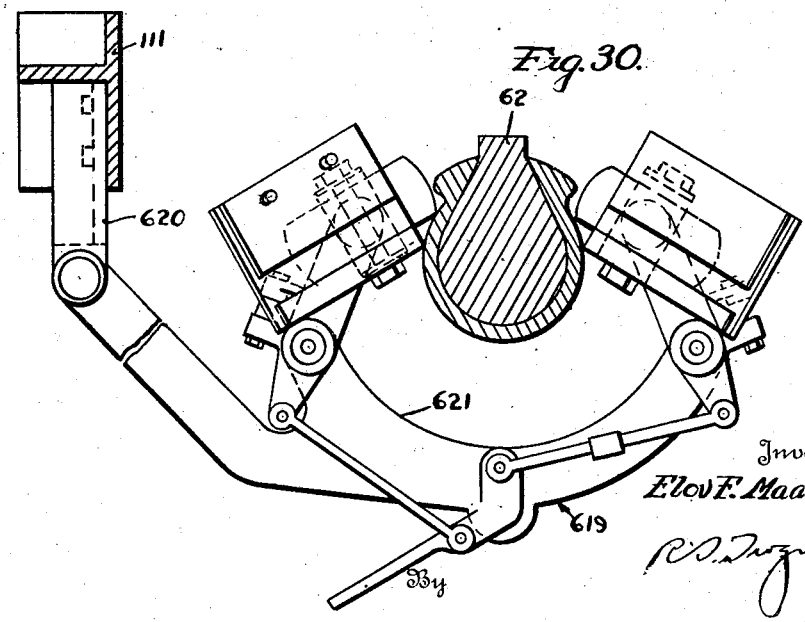
Inventor
Elov F. Maas.
By
Attorney Aug. 11, 1931.  E. F. MAAS  1,818,955
METHOD OF AND APPARATUS FOR MANUFACTURING PNEUMATIC TIRES
Filed June 28, 1929   16 Sheets-Sheet 5
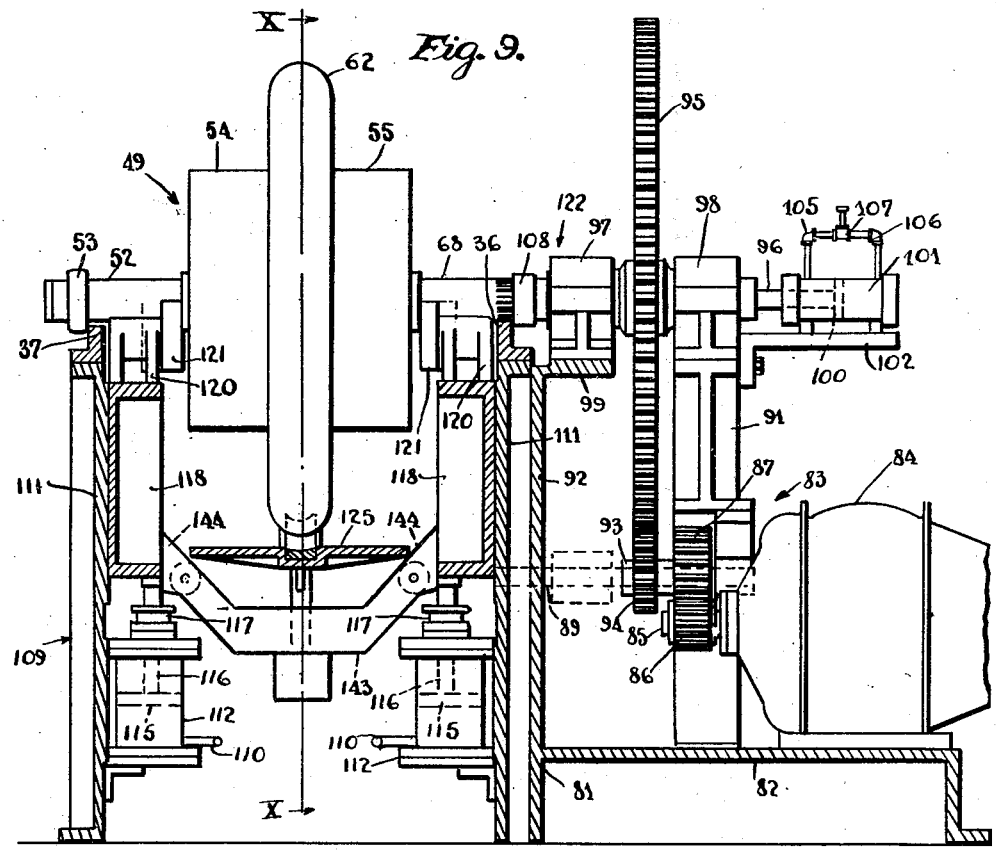
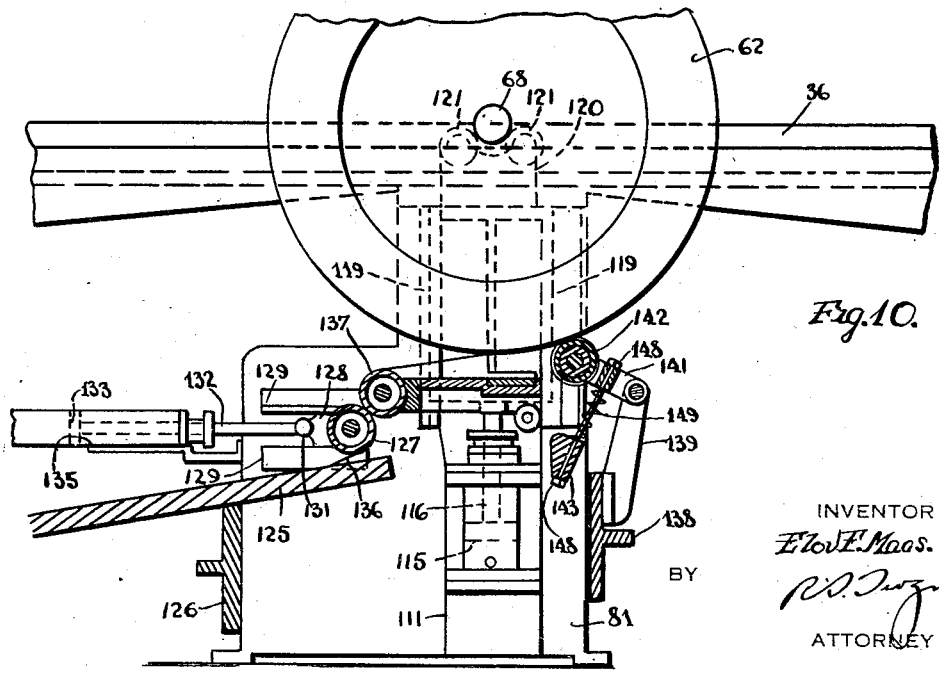
INVENTOR
E. F. Maas
BY
ATTORNEY

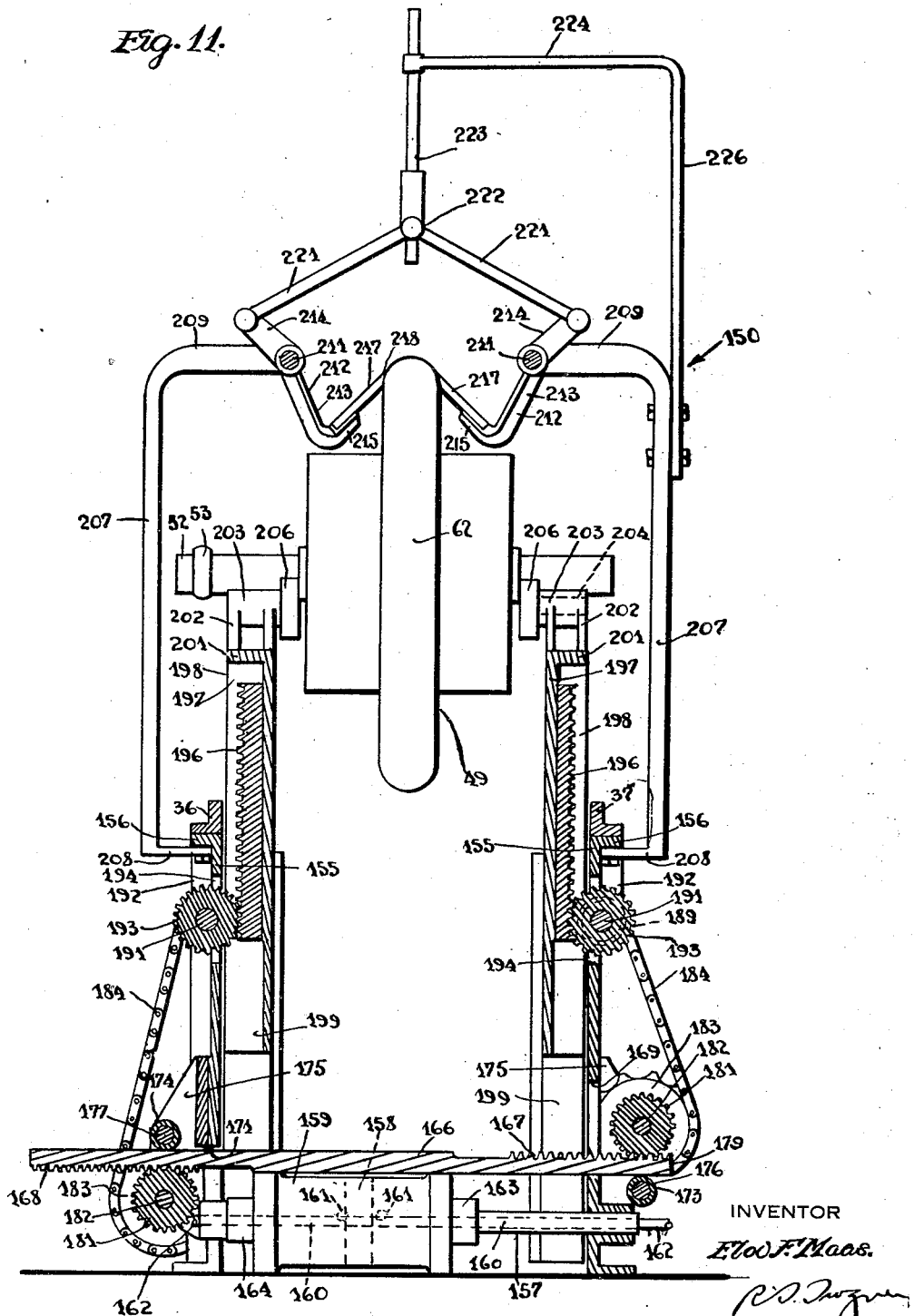

Aug. 11, 1931.   E. F. MAAS   1,818,955
METHOD OF AND APPARATUS FOR MANUFACTURING PNEUMATIC TIRES
Filed June 28, 1929   16 Sheets-Sheet 7

Inventor
Eloo F. Maas.

By

Attorney

Aug. 11, 1931.  E. F. MAAS  1,818,955
METHOD OF AND APPARATUS FOR MANUFACTURING PNEUMATIC TIRES
Filed June 28, 1929  16 Sheets-Sheet 8

Inventor
Elod F. Maas.
By
Attorney

Aug. 11, 1931.  E. F. MAAS  1,818,955
METHOD OF AND APPARATUS FOR MANUFACTURING PNEUMATIC TIRES
Filed June 28, 1929  16 Sheets-Sheet 9
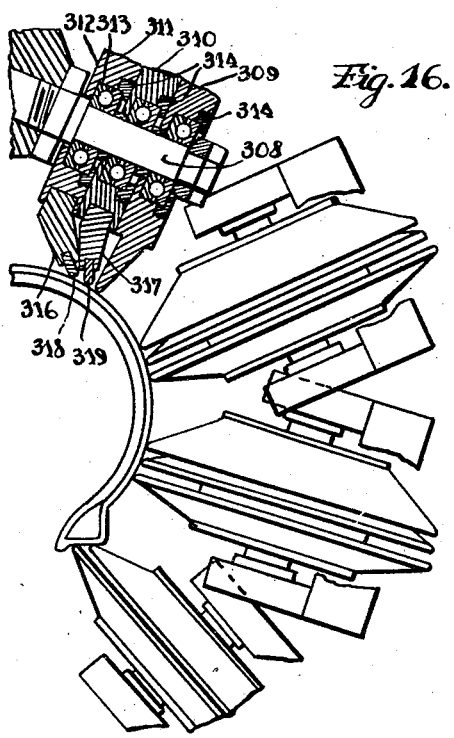
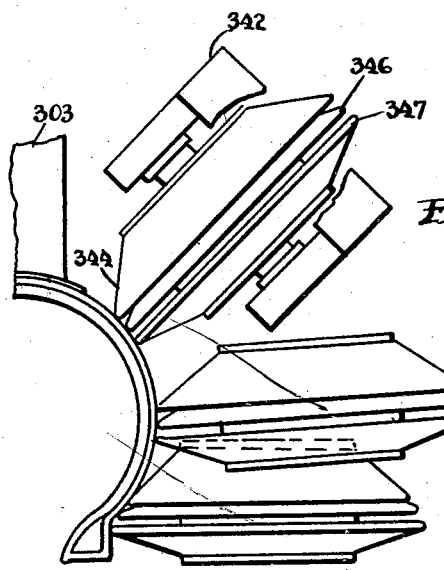
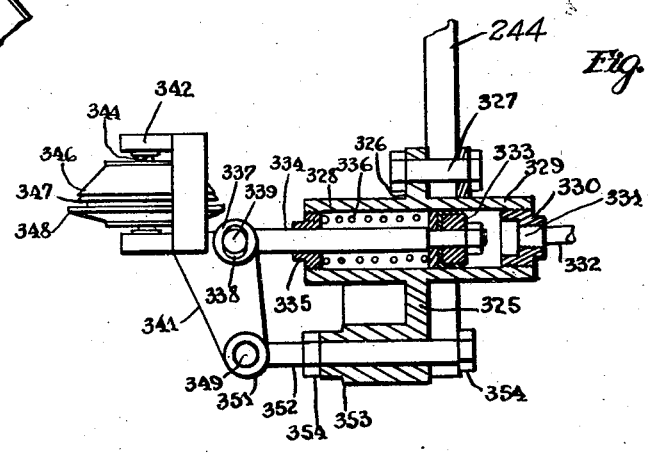
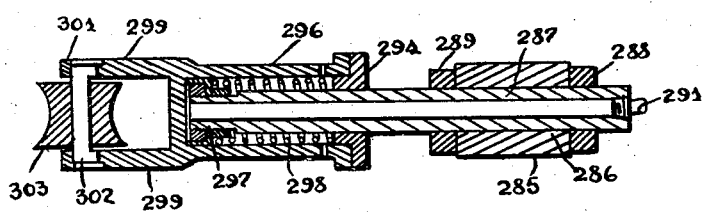
Inventor
Eloo F. Maas.
By
Attorney

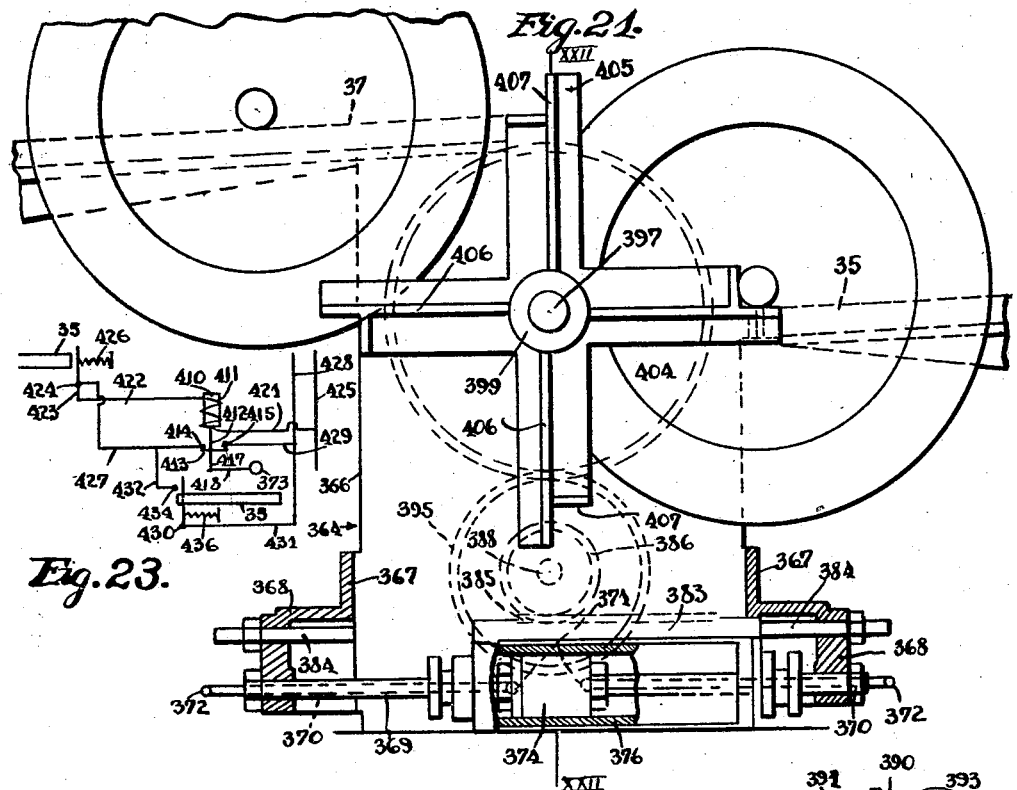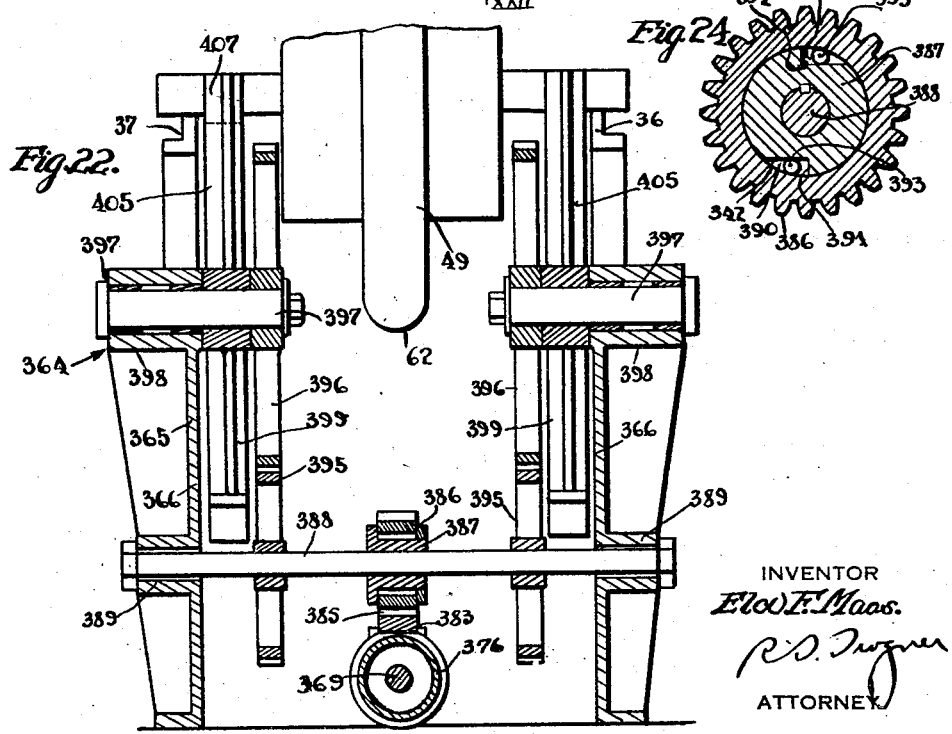

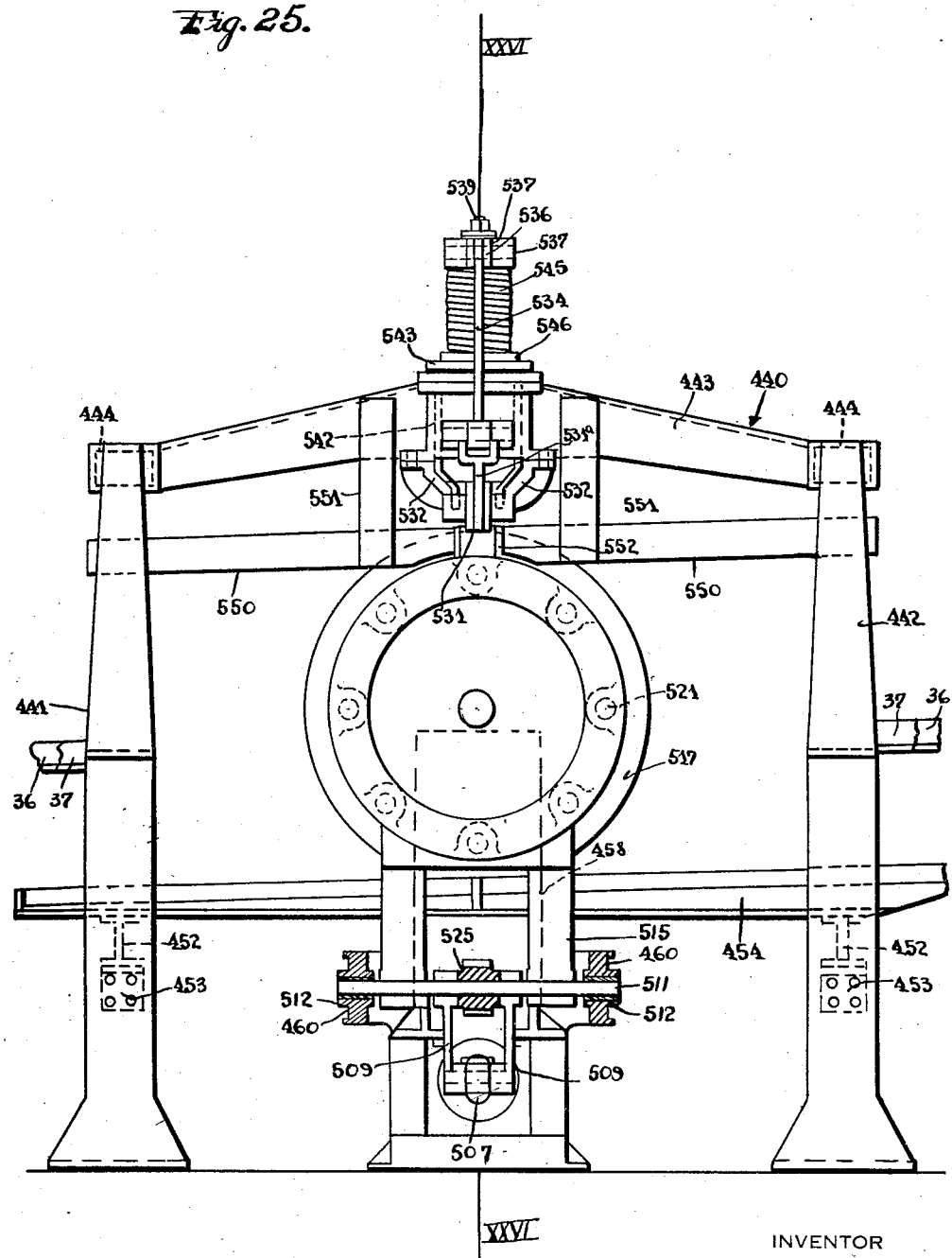

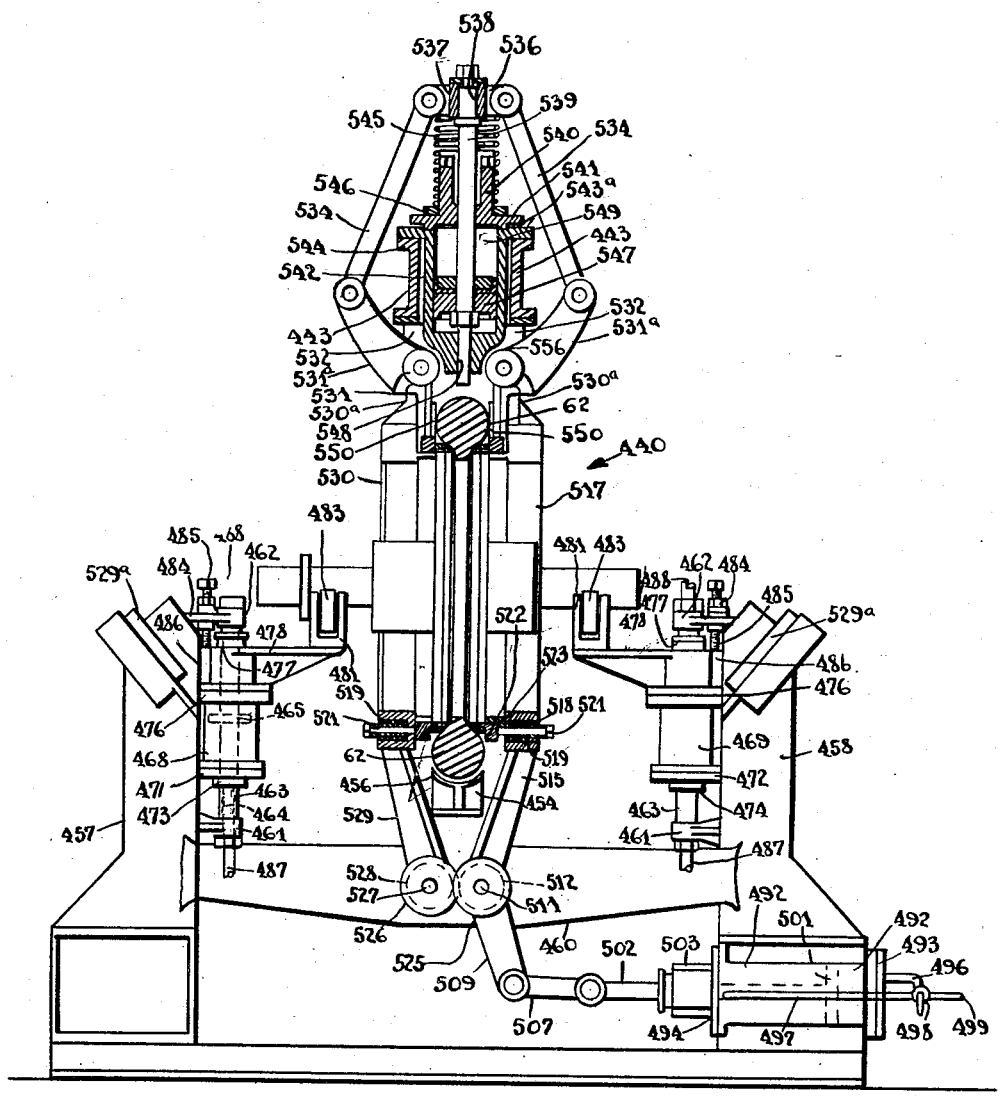

Aug. 11, 1931.  E. F. MAAS  1,818,955
METHOD OF AND APPARATUS FOR MANUFACTURING PNEUMATIC TIRES
Filed June 28, 1929  16 Sheets-Sheet 14

INVENTOR
Elov. F. Maas.
ATTORNEY

Aug. 11, 1931.  E. F. MAAS  1,818,955
METHOD OF AND APPARATUS FOR MANUFACTURING PNEUMATIC TIRES
Filed June 28, 1929  16 Sheets-Sheet 15
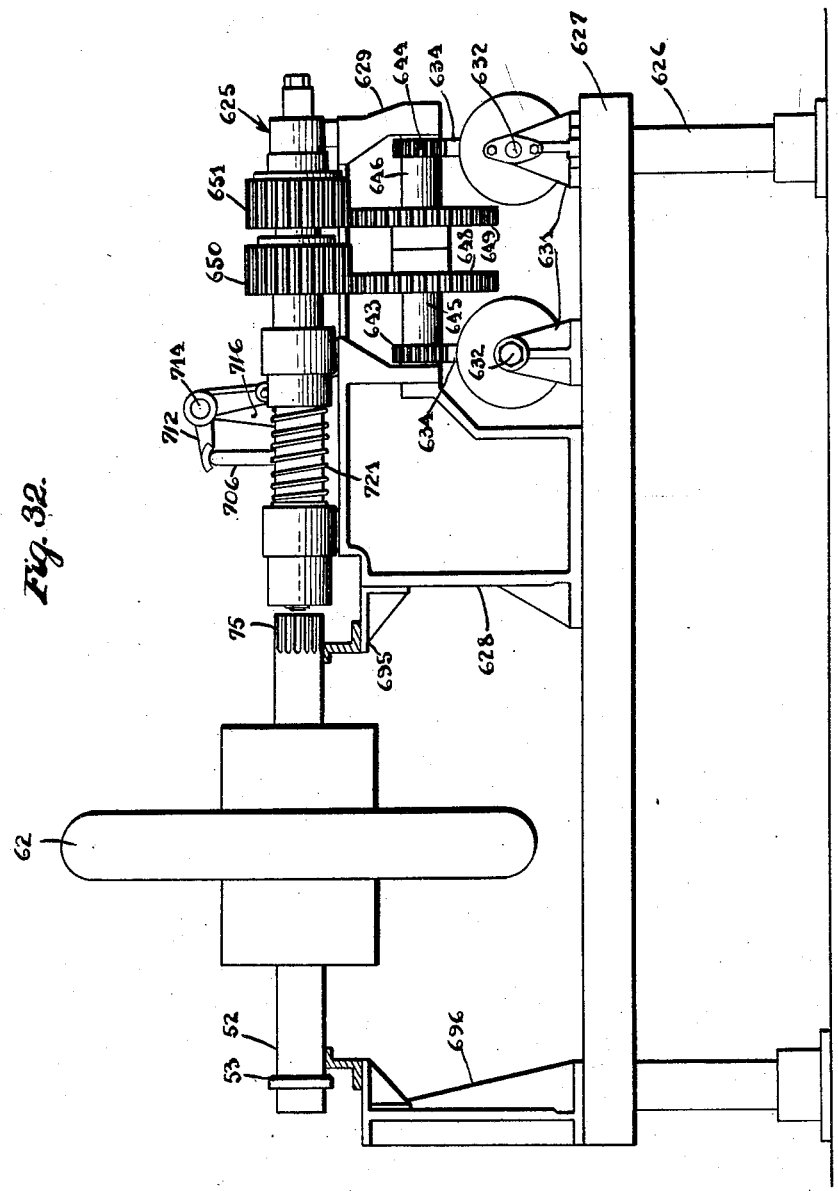
INVENTOR
*Elof F. Maas.*
BY
ATTORNEY

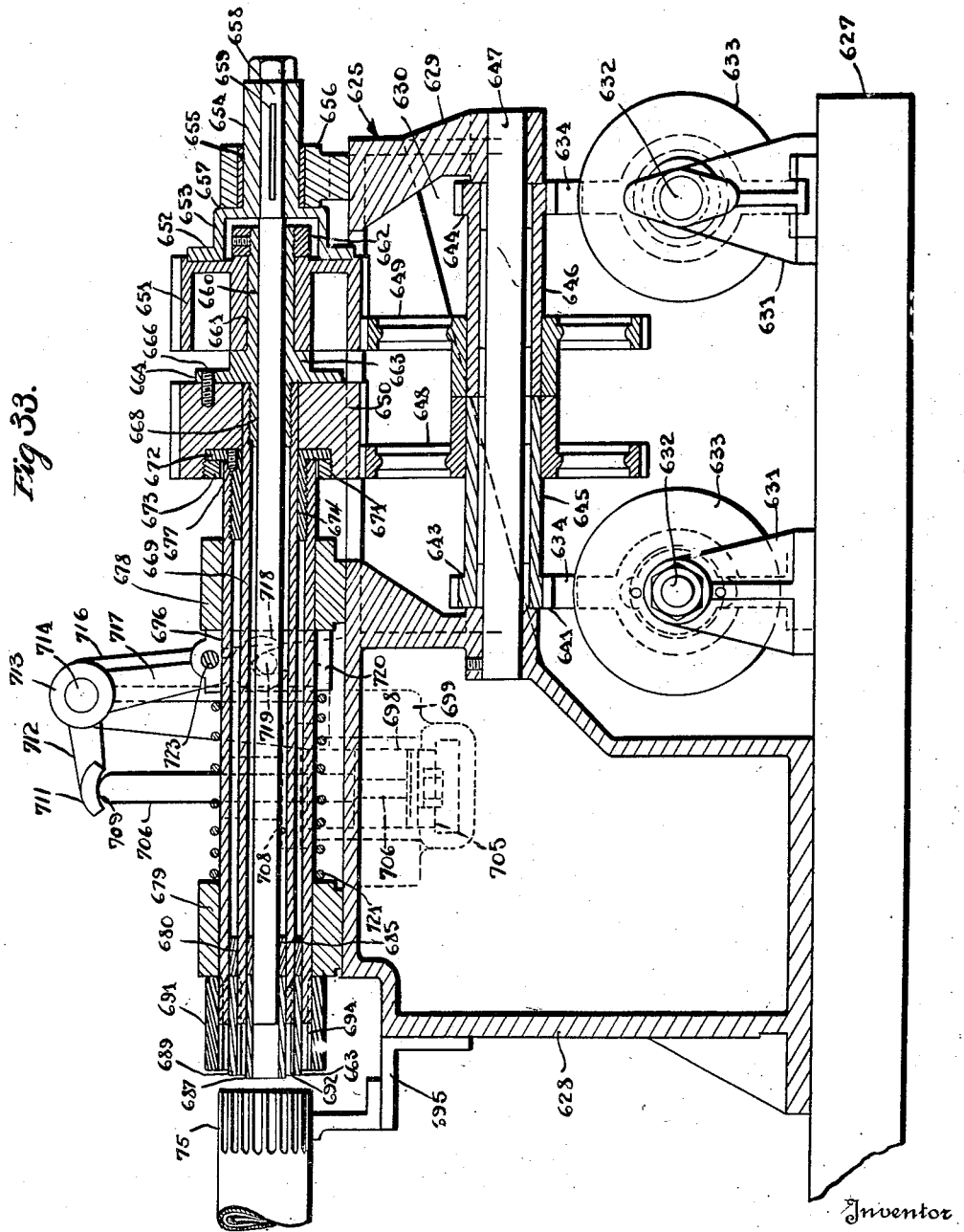

Patented Aug. 11, 1931

1,818,955

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR MANUFACTURING PNEUMATIC TIRES

Application filed June 28, 1929. Serial No. 374,487.

This invention relates to the fabrication of pneumatic tires and it has particular relation to a machine for performing the various steps involved in the assembly of the elements of the tires.

One object of the invention is to provide a machine in which the tire building cores are transported past a series of stations each of which is equipped to perform a special operation upon the tires under construction.

Another object of the invention is to provide a novel mechanism for translating pneumatic tire cores from one fabricating station to another.

Another object of the invention is to provide a novel tire core that may be readily attached and detached from various fabricating mechanisms.

A further object of the invention is to provide certain novel structures whereby the various operations performed upon pneumatic tires during the course of fabrication are facilitated.

One method of fabricating pneumatic tires consists in stitching together the various plies of which the tires are composed upon a revolving mandrel or core that is permanently secured to a tire building machine. This method is objectionable because all of the operations essential to the fabrication of the tires must be performed upon a single machine and by a single operator. Since a considerable number of different operations are performed upon each tire during the course of construction, it is necessary to have a relatively large number of specialized tools and mechanisms associated as elements of the machine; for example, each machine must be equipped with devices for applying the fabric, the beads, the breaker strips, and treads of tires. Such machines are relatively complicated and, moreover, many of the associated elements thereof must stand idle while certain operations are being performed by means of the other elements. Also, each operator is required to perform many operations upon a tire. Much time is lost in changing from one mechanism to another and, furthermore, since each operator must be familiar with all of the steps performed in the assembly of the tires, it takes a relatively long period of time in order properly to train new operators.

In a machine constructed according to the principles of this invention, a number of tire building cores are mounted upon detachable spindles. The devices for performing the various operations upon the tire are arranged in a train or series and connecting means is provided for translating the cores from one device to the next.

For a better understanding of the invention, reference may now be had to the accompanying drawings, forming a part of the specification, of which:

Figure 1 is a fragmentary assembly view of one portion of the machine involving the invention;

Figure 2 is a fragmentary plan view of another portion comprising a continuation of the machine shown in Figure 1;

Figures 3 and 4 are fragmentary elevational views, on a larger scale, illustrating certain of the tire fabricating units employed in the invention;

Figure 5 is a cross-sectional view of a collapsible tire building chuck and core;

Figure 6 is a fragmentary detail view, on a larger scale, of certain portions of the chuck shown in Figure 5;

Figure 7 is a cross-sectional view, on a larger scale, taken substantially along the line VII—VII of Figure 5;

Figure 8 is an elevational assembly view of a unit equipped with means for centering and rotating tire chucks;

Figure 9 is an assembly view, partially in elevation and partially in cross-section, of a unit for applying fabric bands to tire cores;

Figure 10 is a cross-sectional view, taken substantially along the line X—X of Figure 9;

Figure 11 is an assembly view, partially in cross-section and partially in elevation, of a unit for splicing the ends of tire bands;

Figure 15 is a view partially in cross-section, of a stitcher unit for stitching plies to the cores;

Figure 16 is a detail view, partially in elevation and partially in cross-section, of the stitcher elements employed in connection with the unit shown in Figure 15;

Figure 17 is a detail view, showing the location of certain of the other stitcher elements employed in connection with the stitcher unit;

Figure 18 is a cross-sectional view of a stitcher device employed for engaging the central portion of a tire carcass;

Figure 19 is a cross-sectional view of one of the stitcher devices employed for stitching those portions of a tire carcass adjacent the peripheral center line thereof;

Figure 20 is a view, partially in elevation and partially in cross-section, of a stitcher unit employed for stitching upon the side portions of a tire carcass;

Figure 21 is a view, partially in elevation and partially in cross-section, of an elevator mechanism employed for raising tire chucks from the lower end of one section of trackway to the upper end of the succeeding section;

Figure 22 is a cross-sectional view, taken substantially along the line XXII—XXII of Figure 21;

Figure 23 is a conventional diagram of the electrical circuit employed to control the operation of the elevator mechanism;

Figure 24 is a cross-sectional view showing in detail the construction of a one-way clutch employed for controlling the operation of the elevator;

Figure 25 is an elevational view of a mechanism for applying beads to tire cores;

Figure 26 is a cross-sectional view, taken substantially along the line XXVI—XXVI of Figure 25;

Figure 30 is a detail view, partially in elevation and partially in cross-section, of a device for applying chafing strips to tire carcasses;

Figure 32 is an elevational view of a tire chuck collapsing mechanism; and

Figure 33 is a cross-sectional view, on a larger scale, disclosing the actuating mechanism employed in connection with the device disclosed in Figure 32.

Figure 12:
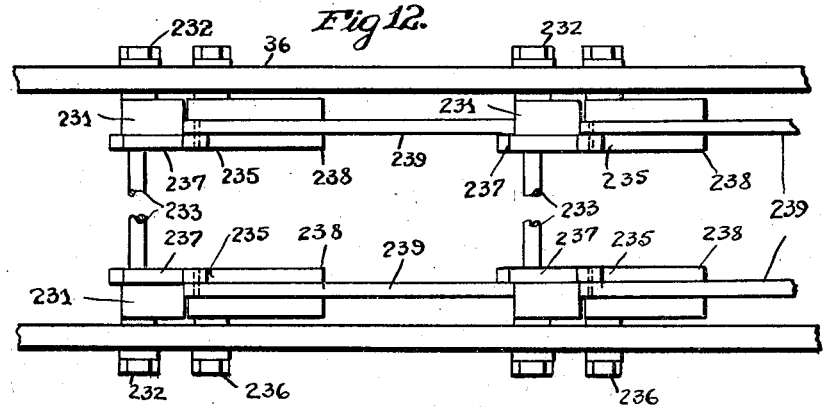
Figure 12 is a fragmentary plan view of stop devices employed in connection with the trackway.

In practicing the invention, a series of pedestals 34 of graduated heights disclosed in Figs. 3 and 4 are arranged to support sloping parallel trackways 36 and 37. In order to form an endless track system, the ends of the trackways 36 and 37 are connected by curved parallel rails 41 and 42, respectively, the latter of which are spaced a slightly greater distance than rails 36 and 37, for a purpose which will be explained later.

These tracks constitute means for translating a series of tire building chucks or cores 49 indicated generally in Figs. 1, 2, 3 and 4 and shown in detail in Figs. 5, 6 and 7 to and from the various fabricating mechanisms which are disposed at intervals therealong.

Since all of the chucks 49 are identical in construction, but one of them will be described in detail. Each chuck comprises a shaft 52, adapted to roll upon the rail 36 and has an annular shoulder 53 formed thereon adapted to roll upon the curved rails 42. The inner end of the spindle is attached to a hub portion 54, registering with a second hub portion 55, that has a chamber 56 formed therein. The hub portions 54 and 55 are formed with complementary grooves 57 which form guide openings for the reception of outwardly projecting racks 58, 59, 60 and 61, the alternate ones of which project in opposite directions. The outer ends of the racks are bolted to toroidal core sections 62 of conventional design.

In order to limit the movement of the racks within the chuck portions 54 and 55, slots 63 are formed adjacent the inner ends of the bars, said slots being engaged by pins 64 disposed transversely within the guide slots 57. One pair of racks (58—60) engage an operating gear 65 that is keyed to a shaft 66, rotatably mounted within a tubular sleeve 67. The latter is, in turn, rotatably mounted within a hollow shaft 68, formed integrally with chuck portion 55 and in axial alignment with shaft 52. The sleeve 67 is provided upon its inner end with a gear 69, similar to the gear 65, which operatively engages the rack bars 59 and 61.

As shown in Figure 7, the outer ends of the hollow shaft 68, the tubular sleeve 67 and the shaft 66 are formed, respectively, with clutch teeth 75, 76 and 77, which serve to connect the core to driving spindles in certain of the mechanisms to be described later.

In transporting a chuck along the trackway, the shaft 52 and a hollow shaft 68 are placed upon the parallel rails 36 and 37, and the cores are permitted to roll by gravity therealong. When the cores are passing around the curved end portions of the trackways, the shoulder portion 53 of the shaft 52 engages the outer rail of the trackway, thus causing the chuck to tend to roll in an arcuate path coinciding with the curve of the trackways.

As best shown in Figures 1, 2 and 8, a device 79 is provided for centering and rotating tire chucks while a coat of cement is applied thereto. This device includes a frame 81, to which is secured a platform portion 82, upon which is mounted a driving mechanism 83 including a motor 84. The latter is provided with a spindle 85, upon which is mounted a gear 86 that engages a gear 87 rigidly secured to a sleeve 88 rotatably mounted upon a shaft 89. One end of the shaft is secured in an opening formed in an upright member 91 upon the platform 82, and the other end is secured in an opening formed in a side portion 92 of the frame 81. A gear 94 upon the sleeve engages a bull gear 95, which is slidably splined to a shaft 96. The latter is slidably and rotatably mounted in bearings 97 and 98 that are secured respectively upon the upper portion of the member 91 and upon a flange 99 upon the upper edge of the member 92.

In order to reciprocate the shaft 96 longitudinally in the bearings 97 and 98, the outer end thereof is provided with a piston head 100, slidably mounted within a fluid confining cylinder 101. The latter is supported upon a projecting platform 102, secured upon the upright member 91. Actuating fluid, such as compressed air, is admitted to the ends of the cylinder by means of conduits 105 and 106, which lead to a multi-passage valve 107 that controls the flow of the compressed fluid from a fluid main (not shown). The end of the shaft opposite the cylinder 101 is provided with a clutch 108 that engages the corresponding clutch portion 75 of the hollow shaft 68 of the tire fabricating core 49.

In order to bring the clutch portion 75 of the chuck spindle into alignment with the clutch portion 108, an elevating and centering mechanism 109 is provided. This portion of the device includes frames 111, disposed adjacent to and in alignment with the driving mechanism 79, and which form supports for the adjacent portions of the rails 41 and 42. Cylinders 112, secured to the inner faces of the frames 111, receive piston heads 115 that actuate the elevator mechanism. The latter comprises piston rods 116 secured to the pistons 115 and extending upwardly through stuffing boxes 117 upon the upper ends of the cylinders. The upper extremities of the rods are attached to slides 118 mounted between guides 119, secured upon the inner sides of the frames 111. The upper ends of the slides 118 are provided with journal brackets 120 rotatably supporting pairs of rollers 121 that engage the shafts 52 and 68 of the tire building core.

In the operation of the mechanism shown in Figure 8, a tire chuck is permitted to travel along the rails 36 and 37 until the shaft thereof is disposed directly above the centering rollers 121. Compressed fluid is then admitted to the cylinders 112 by means of suitable conduits 110. This operation causes the pistons 115 to be actuated upwardly, thereby lifting and centering the shafts 52 and 68 upon the rollers 121. By admitting compressed fluid to the rear end of the cylinder 101, the shaft 96 is shifted forwardly to cause the clutch 108 to engage the clutch teeth 75 upon the shaft 68. By energizing the motor 84, rotational motion is imparted to the chuck 49.

As shown in Figures 9 and 10, a unit 122, generally similar in construction to the unit 79, the corresponding elements of which are correspondingly numbered, is provided with mechanism for applying fabric bands to the tire cores 62. This mechanism comprises a guide 125, secured upon a cross bar 126, attached to the edges of the frames 111. A movable feed roller 127, disposed adjacent the inner end of the guideway, is journalled within bearing slides 128 which are mounted between horizontally disposed guides 129, attached to the frames 111. The slides 128 are connected by a cross rod 131, attached at its mid portion to a piston rod 132, which is rigidly secured to a piston head 133, slidably mounted within a cylinder 135 which is attached to a portion of the frame 81. Tension is applied to the fabric 136 as it is fed forwardly by means of a roller 137, so disposed in bearings formed in the frames 111 as to contact with the roller 127 when the latter is in its forward position.

The fabric 136 is stitched to the tire carcass by means of a mechanism comprising a cross bar 138, which is secured to the frames 111. A bracket 139 is attached to the cross bar and has pivotally secured to the upper end thereof an arm 141 that supports upon its free end a stitcher roller 142 that engages the core 62. The roller is raised or lowered to bring it into contact with the tire carcass by means of a cross bar 143 attached to inwardly projecting brackets 144 upon the vertically operable slides 118. The bar is connected to the arm 141 by means of a bolt 148, slidably mounted within an opening formed in the arm 141. In order to maintain the arm 141 yieldably in an elevated position, a coil spring 149 is disposed upon the bolt 148 and rests at one end upon the bar 143 and at the other end engages the lower side of the arm 141.

In operating the band applying unit a tire chuck 49 is permitted to roll along the tracks 36 and 37 until the shafts 52 and 68 are disposed directly above the rollers 121. Compressed fluid is then admitted to the cylinders 112 to actuate the slides 118. This operation causes the rollers to ascend and lift the chuck from the track. By opening the valve 107, compressed fluid is admitted to the cylinder 101, thereby actuating the piston 100 and thrusting the shaft 96 forwardly to mesh the clutch member 108 with the corresponding clutch portion 75 of the shaft 68.

By admitting compressed fluid to the cylinder 135, the piston rod 132 is actuated rearwardly to separate the rollers 127 and 137. Fabric may then be drawn forwardly along the guide 125, directed between the rollers 127 and 137 and brought forward to position the ends thereof between the chuck 51 and the stitcher roller 142. Then the motor 84 is energized to rotate the chuck 49, thereby causing the fabric 136 to be drawn forwardly and stitched to the surface of the core 62 by means of the stitcher roller 142. The chucks are released by disengaging the clutch portions 108 and 75 and then permitting the slides 118 to descend thus depositing the shafts of the chucks upon the rails 36 and 37.

As shown in Figures 1 and 11, the tire building machine is provided with a plurality of band splicing mechanisms 150, each comprising a pedestal or frame 155 having outwardly turned flanges 156 formed along the upper side edges thereof, upon which are mounted the rails 36 and 37 for supporting and guiding the traveling chucks 49.

A piston rod 157, secured transversely of the pedestal 155, near the base thereof, has a piston head 158 secured at or near its mid portion, and a cylinder 159 is slidably mounted thereon. The rod 157 is bored to form fluid passages 160, that terminate in openings 161 within the cylinder 159. The outer extremities of the passages communicate with conduits 162 for supplying fluid under pressure. The ends of the cylinder 159 are provided with piston glands 163 and 164, that fit tightly about the rod 157 to prevent leakage of compressed fluid.

A bar 166, secured to the upper portion of the cylinder 159, has projecting rack portions 167 and 168 extending outwardly through openings 169 and 171, formed in the side walls of the pedestal 155. The lower face of the rack portion 167 and the upper face of the rack portion 168 respectively engage guide rollers 173 and 174, mounted upon shafts 176 and 177 which are journaled in brackets 175 secured to the sides of the base 155.

The toothed faces of the rack portions engage gears 181 which are keyed to shafts 182 which are also journaled in the brackets 175. The latter shafts are provided with sprocket gears 183, about which are trained sprocket chains 184, that extend upwardly about a second set of sprocket gears 189. These gears in turn are keyed to shafts 191, journaled in bearings formed in flanges 192 on the sides of the pedestal 155. Each shaft is provided with a gear 193, which projects inwardly through an opening 194 formed in the side of the pedestal 155, and engages a vertically reciprocable rack 196. The latter members are secured to the mid portions of a pair of vertically reciprocable slides 197. Outwardly projecting flanges 198 are formed along the side edges of the slides and engage guideways 199 which are attached to the inner faces of the opposite side walls of the pedestal 155. The slides 197 have horizontal flanges 201 upon their upper edges, to which are attached upwardly extending journal brackets 202. These members, in turn, have integrally formed therewith bearing portions 203, within which are journaled outwardly extending shafts 204 of rollers 206, that center and support the ends of the shaft of the chucks 49.

In order to splice the ends of the bands which are cemented to the tire core, the splicing device is provided with upwardly extending members 207 having inwardly directed horizontal portions 208 upon their lower ends that are bolted to the lower sides of the flanges 156. The upper ends of the upright members 207 are formed with inwardly projecting horizontal portions 209, having bearings formed therein for pivot pins 211. Arms 212, having oppositely projecting end portions 213 and 214, are pivotally secured upon the latter members. The lower portions 213 are formed with inwardly directed end portions 215, to which are secured splicing plates 217, upon which the ends of a band 218 may rest while being spliced. The upper ends of the arms 214 are interconnected by means of toggle links 221, hingedly connected at 222 to a guide member 223. The latter extends upwardly through a guide opening formed in a horizontal arm 224 that constitutes a portion of an upwardly projecting standard 226, bolted to the upper end of one of the supports 207.

In the operation of one of the band splicing units, a core 49 having unspliced bands cemented thereto is permitted to travel along the trackways 36, 37, until it is disposed directly above the rollers 206, which it will be assumed are in their lowermost position. Fluid under pressure is then admitted to the cylinder 159 to operate the latter, and, in turn, to operate the gears 181 which transmit rotation to the shafts 191 through the medium of the sprocket chains 184 and the sprocket gears 189. Rotation of the shafts 191 causes the rack bars 196 to be actuated upwardly, thus lifting the traveling chucks from the tracks and supporting them upon the rollers 206 in a position adjacent the band splicing plates 217. The guide 223 is then manually raised in order to swing the plates 217 inwardly under laterally extending edge portions of the band 218. The ends of the bands are then brought together and manually stitched to one another upon the plates. Finally, fluid under compression is admitted to the opposite end of the cylinder 159, to cause the latter to be moved in the opposite direction and thus to actuate the slides 197 downwardly to deposit the shafts of the chuck upon the trackways.

Figure 13:
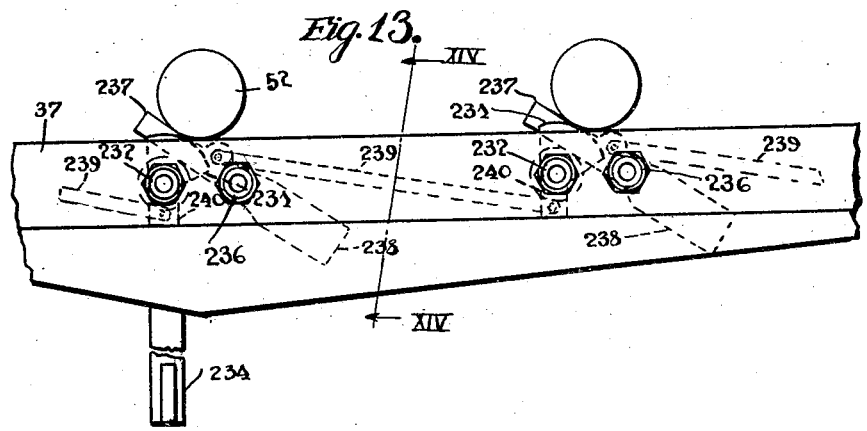
Figure 13 is a fragmentary elevational view of the mechanism shown in Figure 12.
Figure 14:
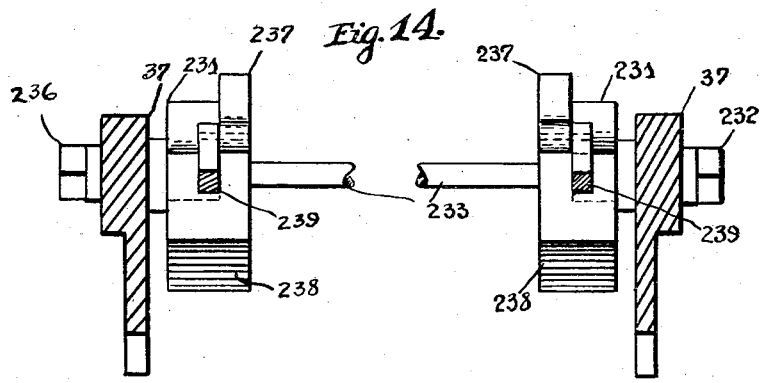
Figure 14 is a cross-sectional view, taken substantially along the line XIV—XIV of Figure 13.

A series of stop mechanisms is provided between the stations in order, in case of delay in the work at any of the stations, to arrest the advancing tire cores until the operator is ready to receive them. These stops are indicated diagrammatically at 230 in Figure 1, and are shown in detail in Figures 12, 13 and 14. Each stop comprises a cam 231, pivoted at 232 upon the sides of the rails 36 and 37, and interconnected by means of a cross bar 233. The cams adjacent the lowermost portions of the rails are provided with handles 234, whereby they may be manually rotated to cause them to disengage from the shafts of the tire chucks. Tripping levers 235, which are pivoted at 236 adjacent all except the rearmost of the cams, have upwardly extending portions 237 that normally project above the level of the rails 36 and 37. The levers also have weighted downwardly extending portions 238 that tend to maintain them in erect position. The upwardly extending portion of each lever 235 is operatively connected to the preceding cam 231 by means of a link 239, pivoted at its rear end to a downwardly extending lug 240 upon the cam.

When the stops are idle the upwardly projecting portions of the arms 235 extend above the trackway in the path of advancing cores and the cams connected thereto are depressed below the surface of the rail. At this time, only the foremost cams having the handles 234 remain in operative position. A chuck traveling along the tracks will successively depress each lever 235 and then pass on to the next lever until it is brought to rest by the lowermost cam. When this occurs the lowermost lever will be held in depressed position and will maintain the preceding cam in position to stop the succeeding chuck. When the latter is brought to rest the third cam of the series will be set. In this way, each cam of the series will be set by the engagement of the chuck with the lever 235 at the succeeding cam. If the foremost chuck is released by manual operation of the lever 234, the lever 235 will swing upon its pivot to depress the next cam of the series and so release the chuck engaged thereby. Each cam will in turn be depressed by release of the preceding chuck from the succeeding cam. However, when the second chuck reaches the lowermost cam it will be stopped thereby, and will set the cam from which it was released to receive the third chuck of the series. In this way all of the chucks will be permitted to move from one cam to the next.

Band stitching stations 242, indicated diagrammatically in Figures 1 and 15, serve to stitch the skirt portions of the bands to the sides of the tire cores. As shown in Figure 15 the stitching station comprises a frame 243 having upright side members 244 disposed upon each side of the trackway and interconnected near their bases by means of cross bars 245. In order to rotate the chucks 49, each station 242 is provided with a driving mechanism 246, identical in construction with driving mechanism 79, shown in Figure 8. Reference may be had to that figure for a complete disclosure of the mechanism. Elevation of the tire cores from the trackways is accomplished by lifting mechanisms 264 secured to the side members 244 of the frame 243. Each mechanism comprises a cylinder 266 having cylinder heads 267 and 268 secured to the ends thereof. The latter members are provided respectively with ducts 269 and 271 for fluid under pressure. The ducts are connected to valves (not shown), whereby the flow of fluid to the cylinders may be controlled.

A piston head 272 is mounted for sliding movement within the cylinder 266 and has attached thereto an upwardly extending piston rod 273 which projects outwardly through a gland 274 that forms a fluid-tight seal thereabout. The piston rod 273 engages at its upper end a horizontal connecting portion 276 of a pair of vertical slides 277 which are directed in a vertical path by means of guides 278.

The upper face of the portion 276 has formed thereon an upwardly extending column 279, to the upper end of which are secured journals 281, within which are journaled the shafts 282 of rollers 283, similar to the rollers 206 disclosed in Figure 11.

Each stitching station is provided with a plurality of pneumatically operated stitching units, certain of which are designed to stitch particular portions of the tire carcass. For stitching the mid portion of the fabric bands, the unit shown in Figures 15 and 18 is provided. The unit comprises a cross bar 285 secured to the upper portions of the members 244 and having an opening 286 formed in the mid portion thereof. A hollow shaft 287 extends through the opening 286 and is secured in position therein by means of upper and lower nuts 288 and 289 screw-threaded thereupon. A fluid conduit 291 is connected to the shaft and leads to a multi-passage valve 292 secured to a bracket 293 upon the forward edge of the side member 244. As best shown in Figure 18, the hollow shaft 287 extends through a head 294 of a cylinder 296 and is provided at its extremity with a piston head 297 fitting closely but slidably within the cylinder. In order to maintain the cylinder in elevated position on the rod 287, a spring 298 is coiled about the latter with one end contacting with the cylinder head 294 and with the other end contacting with the piston 297. The cylinder 296 has integrally formed downwardly projecting lugs 299, secured upon opposite sides of the lower end thereof and each lug is provided with a bearing portion 301, within which are journaled the extremities of a shaft 302 of a concave stitcher roller 303.

A second stitching device for stitching the portions of the tire bands adjacent to the portions stitched by the stitcher roller 303, is indicated at 305 in Figures 15 and 19. This unit is identical in construction with the unit just described, except that the lower end of the cylinder 306, corresponding to the cylinder 296, is provided with a head portion 307 having diverging stud bolts 308 screw-threaded therein in lieu of the lugs 299. A plurality of stitcher discs 309, 310 and 311 are rotatably mounted upon each bolt 308. As shown in Figure 16, these discs each include a central portion 312 having an opening formed therein, in which is mounted a ball bearing 313. The latter is held in position by means of rings 314, screw-threaded into the openings for the bearings. The discs 310 and 311 are also provided with rim portions 316 and 317, which are directed outwardly toward the disc 309. The rim portions are formed with peripheral grooves, within which are mounted edge portions 318 and 319 that contact with the surface of the tire under construction.

In order to stitch the fabric along the side walls and the beads of the tire, a plurality of the stitching mechanisms disclosed in Figure 20 are provided. Since each of the latter devices is substantially similar to the others, a description of one is sufficient for all.

Each unit includes a base 325, secured to a side portion 244 by means of a flange 326 and a bolt 327. The base 325 is, also, formed with a horizontally extending tubular portion 328, the rear portion 329 of which extends outwardly through an opening in the frame 244. The latter is provided with a screw-threaded plug 330 which has an opening 331 for receiving a fluid conduit 332, leading to the multipassage valve 293. A piston 333 slidably mounted within the tubular portion 328 has rigidly secured thereto a piston rod 334 that extends forwardly through a screw-threaded plug 335, which forms a cylinder head in the forward end of the tubular portion.

In order to maintain the piston in retracted position, a coiled spring 336 is mounted on the rod 334 with one end pressing the piston head 333 and the other end pressing the plug 335. The forward end of the piston rod 334 is provided with an enlarged portion 337, within which is formed an ovoid opening 338 that constitutes a bearing for a pivot pin 339, rigidly secured to an arm 341. One end of the arm 341 is rigidly secured to a head portion 342 having an opening 343 (see Figure 15) formed therein. A shaft 344 is secured transversely within the opening 343 with its axis substantially parallel with respect to the peripheral axis of the tire core and a set of stitcher discs 346, 347 and 348, substantially similar to the stitcher discs 309, 310 and 311, are journaled upon the shaft. The other end of the arm 341 is pivoted upon a pin 349 secured in an enlarged portion 351 upon the end of a bolt 352. The latter extends through a boss 353 upon the attaching base 325 and through the frame 244, and is firmly secured in position by means of lock nuts 354. The number of stitching units, similar to the unit just described, that may be required will, of course, depend upon the size of tire which it is desired to manufacture. Six such units, however, upon a side are disclosed in the drawings, but this number may be varied at will.

In the operation of the mechanism a tire building chuck is correctly centered by elevating it upon the rollers 283. Rotational movement is then imparted thereto by means of the driving device 246. Next the multipassage valve 292 is operated to actuate the stitching devices into contact with the ply of material which is being operated upon. In this operation the central unit 303 should first come into play and the remaining units should then be operated in succession in order progressively to stitch the ply from the mid portion toward the edges thereof. After the stitching operation is complete the chuck is lowered to the trackway and is permitted to pass to the next station.

Since the trackways 36 and 37 are formed in inclined sections with the lower end of one section disposed below the higher end of the succeeding section, it is necessary to provide means disclosed in general in Figs. 1, 2, 3, and 4 and in detail in Figs. 21, 22, 23 and 24 for elevating the tire chucks from one track section to the succeeding section. An elevating mechanism 364 includes frames 366 interconnected by means of cross bars 367. Outwardly projecting portions 368 of the bars 367 support a piston rod 369 rigidly secured thereto. The rod is provided with longitudinal ducts 370 that open at 371 near the mid portion of the rod and which communicate at their outer ends with fluid ducts 372 which lead to a multi-passage valve 373, indicated diagrammatically in Figure 23. Also, a piston head 374 is secured at the mid portion of the piston rod 369 and is slidably mounted within a reciprocating fluid actuated cylinder 376.

A rack 383 of substantially the same length as the cylinder 376 is rigidly secured to the upper portion of that member in parallel relation with respect to the axis of the piston rod 369. In order to limit the travel of the rock bar 383 and the cylinder 376, adjustable bolts 384 are secured within the offset portion 368 of the connecting bars 367 in position to engage the ends of the rack 383 at the end of its path of travel.

The upper face of the rack bar 383 is formed with rack teeth 385 that engage a gear 386 rotatably mounted upon an internal clutch element 387 which is keyed to a horizontal shaft 388. The latter, in turn, is journaled in bearings 389 formed in the side members 366. In order to permit rotation of the gear 386 in a single direction upon the clutch element 387, and to prevent reverse rotation, the clutch element is formed with longitudinal slots 390, each of which has a side 391 disposed substantially radially with respect to the shaft 388 and a second side 392 disposed substantially perpendicularly with respect to the first mentioned side. Locking or gripping rollers 393 are so disposed in the slots 390 that rotation of the gear 386 in a clockwise direction causes them to be wedged into the narrow portion of the opening formed between the walls of the slots 390 and the inner periphery of the gear 386. The gear and the clutch element 387 are, therefore, locked together by frictional engagement between the roller and the sides of the slot, and are thus caused to rotate as a unit. However, upon rotating the gear in the opposite direction, the rollers 393 are carried to the relatively wide portions of the slots and, therefore, do not bind the gear and the clutch element together. The gear then rotates independently of the clutch element. In this manner intermittent rotation of the shaft 388 in a single direction is obtained by reciprocation of the piston rod 369.

Gears 395 are rigidly secured upon the shaft 388 upon opposite sides of the gear 386 and engage gears 396 rigidly keyed to stud shafts 397. The latter are journaled within bearings 398, integrally formed upon the side members 366, and support elevators 399 which comprise radially disposed chuck engaging arms 405 rigidly secured to the shafts 397 between the gears 396 and the inner faces of the frames 366. Each arm 405 is provided with stiffening flanges 406 and is provided at the end thereof with a notch 407 having its walls meeting at an angle of 90 degrees and so disposed as to receive the shafts of tire building chucks 49. The lower ends of the track sections are disposed in such position that they will be substantially on a level with the notches 407 when one of the arms 405 is in a horizontal position, and the upper track is disposed at such height that the slot 407 will register therewith when one of the arms 405 is in vertical position.

The elevator mechanism is rendered automatic in its action by the provision of suitable mechanism for operating the valve 373 when a tire chuck is to be elevated or released. This mechanism, as shown in Figure 23, comprises a solenoid 410 having a plunger 411 slidably mounted therein. The plunger is secured to a downwardly extending connecting rod 412 that is provided at its lower end with a cross arm 413, which bridges a gap between electric contacts 414 and 415. Also, the lower end of the rod 412 is pivotally attached to a link 417 which is hinged to the free extremity of an operating lever 418 of the valve 373. Energizing current is supplied to the solenoid by means of wires 421 and 422, the latter of which is connected to a pivoted switch lever 423, which is held in engagement with a contact point 424 by means of a coil spring 426 attached to any convenient fixed support. The contact points 424 and 414 are interconnected by means of a line 427, and the contact point 415 is connected to an electrical main 428 by means of a line 429. Another electrical main 425 is connected to the wire 421. A switch mechanism comprising a pivoted switch lever 430 is connected in parallel with the contacts 414—415 by means of a conductor 431 attached to the line 428, and a conductor 432 connects the contact point 434 of the switch to the line 427. The point 434 is so disposed as to be engaged by the switch lever 430 when the latter is depressed; however, the lever is normally held out of contact with the contact point by means of a tension spring 436.

Presuming that the mechanism is in normal position with one of the arms 405 disposed horizontally and with the notch 407 in alignment with the lower end of the preceding track section, a tire core traveling along the trackway will roll into the notch 407 and be stopped thereby. At the same time, the switch lever 430 will be depressed to cause it to contact with the point 434, thereby energizing the solenoid 410 and lifting the plunger 411 to bring the cross bar 413 into contact with the points 414 and 415. At the same time, the lever 418 of the valve 373 will be operated to admit compressed fluid into one end of the cylinder 376. The latter will reciprocate upon the piston 374 and through the medium of the rack 383 will transmit an anti-clockwise rotational movement to the radial arm 405. The arm will then be rotated to a vertical position and will there deposit the tire core upon the upper end of the succeeding trackway.

When the tire core reaches its uppermost position, it contacts with the switch arm 423 and opens the circuit between the lines 422 and the line 421. This causes the solenoid 410 to be de-energized and permits the plunger to descend and operate the valve lever 418, thus so disposing the multi-passage valve mechanism 373 as to release the compressed fluid in one end of the cylinder 376 and to admit fluid to the opposite end thereof. Then the cylinder is returned to its initial position. During this reverse movement, the gear 386 rotates upon the clutch element 387 without transmitting movement to the latter. When the cylinder has reached its initial position it is then in readiness for a repetition of the cycle of operation.

A bead setting station 440 diagrammatically shown in Figure 1 is disclosed in detail in Figures 25 and 26. This station includes a pair of upright end frames 441 and 442, arranged transversely of the racks 36 and 37, and interconnected at their upper ends by means of a pair of cross bars 443 that are held in parallel spaced relation with respect to each other by means of blocks 444 disposed between them adjacent the ends thereof.

In order to permit beads to be passed over the ends of the chuck shafts 52 and 68, the track 35 is discontinued between the end frames 441 and 442. The tire chucks are supported while traveling across this space by means of a beam 454 having a channel-like face 456. This beam is suported upon transverse beams 452 that are carried by angle brackets 453 bolted to the frames 441 and 442.

A pair of vertically disposed pedestals 457 and 458, interconnected by cross beams 460, are disposed midway between the end frames 442 transversely with respect to the beam 454. The pedestals are provided with lower brackets 461 and upper brackets 462 secured to the inner faces thereof for supporting vertically disposed piston rods 463, bored, as indicated at 464, to form conduits for fluid under pressure. Piston heads 465, secured to the mid-portions of the piston rods, fit slidably within vertically movable fluid actuated cylinders 468 and 469. In order to close the lower ends of the latter members, they are provided with cylinder heads 471 and 472, equipped with stuffing boxes 473 and 474, which form fluid-tight seals about the piston rods 463. Also, the upper ends of the cylinders are provided with heads 476, having stuffing boxes 477 that fit tightly about the piston rods at the upper ends of the cylinders. The heads 476 are formed with inwardly projecting arms 478, the inner extremities of which have vertically projecting bifurcated portions 481 that serve as journals for chuck shaft supporting and centering rollers 483.

In order to limit the vertical movement of the elevating cylinders, the upper brackets 462 are formed with bosses 484 which are bored and tapped to receive vertically adjustable set screws 485 that extend into the path of rearwardly projecting shoulders 486 formed upon the portions 478.

Operation of the cylinders 468 and 469 is secured by attaching the ends of the tubular piston rods 463 to conduits 487 and 488 for fluid under pressure which are provided with control valves (not shown) and which are connected to a fluid main (also not shown).

The pedestal 458 is provided near the base thereof with an opening, within which is fitted a horizontal cylinder 492 having a rear cylinder head 493 and a forward cylinder head 494. Actuating fluid is admitted to the cylinder through fluid conduits 496 and 497 which are connected by means of a multipassage valve 498 to a fluid main 499. A piston head 501 is slidably fitted within the cylinder 492 and is rigidly attached to the rear end of a piston rod 502 that projects forwardly through a stuffing box 503 upon the outer portion of the cylinder head 494. The forward end of the piston rod 502 is pivotally connected by means of a link 507 to the lower end of a pair of parallel levers 509 which are rigidly attached at the upper ends thereof to a horizontal shaft 511. The latter is journalled in bearings 512 formed in the cross beams 460 interconnecting the pedestals 457 and 458.

Upwardly projecting arms 515 are keyed upon the shaft 511 and at their upper ends they support a bead setting ring 517. As best shown in Figure 26, the latter is formed with spaced openings 518 containing helical springs 519 that resiliently engage bolts 521 extending forwardly through openings in the rings 517. The bolts constitute resilient supports for annular bead seats 522 whose inner sides are formed with bead engaging surfaces 523.

A gear 525 rigidly secured to the shaft 511 intermediately of the arms 515 engages a second gear 526, which is rigidly secured to a shaft 527. The shaft is journaled in bearings 528, formed in spaced parallel relation with respect to the shaft 511 in the beams 460. Arms 529, similar to the arms 515, are rigidly secured to the latter shaft and are rigidly secured at their upper ends to a bead setting ring 530 identical in construction with the ring 517. It will be noted that the upper ends of the pedestals 457 and 458 are beveled inwardly and blocks 529a of rubber or other resilient material are mounted thereon in such position as to constitute rests for the bead rings.

In order to press the upper portions of the rings 517 and 530 firmly against the side of a tire core 62 mounted in the unit, the upper portions of the rings are formed with shoulder portions 530a which project, when the bead setting rings are in their uppermost position, into engagement with shoulders 531 formed adjacent the lower ends of levers 531a. The latter are journaled upon downwardly extending brackets 532 which are secured upon the lower edges of the beams 443.

The levers 531a are pivoted at their upper ends to connecting links 534, formed with bearings which in turn are secured in bifurcated portions 536 of a connecting head 537. As best shown in Figure 26, the latter member is provided with a centrally located opening 538, through which extends a vertically disposed piston rod 539, that extends downwardly through a stuffing box 540 upon a head 541 of a cylinder 542. In order to secure the cylinder in position, the cylinder 542 is provided with a flange 543a which is attached to the upper edges of the beams 443.

The piston rod is maintained in retracted position by means of a coil spring 545 which is disposed upon it and which engages at its upper end with the cross head 537, and at its lower end a washer 546, surrounding the stuffing box 540. A piston head 547, secured to the intermediate portion of the piston rod serves as means for actuating the links 534. The lower extremity of the piston rod extends downwardly through an opening 548, formed within the lower end of the cylinder 542. For the purpose of actuating the piston a fluid conduit 549 extends through the wall of the cylinder 542 and is connected to a fluid supply main (not shown).

The tire cores 62 are maintained in vertical position between the bead setting rings 517 by means of guide rails 550, supported in spaced parallel relation with respect to the beam 454 by means of downwardly extending arms 551, rigidly attached to the cross bars 443. As indicated at 552, the adjacent ends of the rails 550 are spaced in order to provide an opening for the operation of the links 531a. The ends of the rails are also slightly cut away in order to permit the upper portions of the bead setting rings 517 to contact with the sides of the core 62.

To operate the bead setting mechanism a tire building chuck having a partially formed tire therein is permitted to roll from the trackway into the channel 456 of the beam 454. It travels along the latter member supported in vertical position by means of the guide rails 550, until the shaft thereof comes into alignment with the rollers 483. Fluid under compression is then admitted to the cylinders 468 and 469, thereby causing the latter to be elevated and thus bring the rollers 483 into engagement with the shafts 52 and 68. By proper manipulation of the set screws 485, the upward travel of the cylinders is so limited as to stop the chuck at the proper height to receive the tire beads. After the beads are positioned upon the bead seats 523 of the bead setting rings, fluid is admitted to the cylinder 492 to actuate the bead setting rings 517 and 530 upwardly and so to bring the beads into engagement with the inner edge of the tire casing side wall positioned upon the chuck.

In order to insure that the upper portions of the beads are pressed with sufficient firmness against the side wall of the tire casing, fluid under pressure is admitted to the cylinder 542 to cause the piston 547 to descend and so to operate the arms 531a as to actuate the shoulders 531 into engagement with the shoulders 530a.

When the bead has been pressed into position, fluid under pressure is admitted to the opposite end of the cylinder 492, thus causing the piston rod 502 to restore the bead setting rings to their original position. The pressure is now released within the lower end of the cylinders 468 and 469, and, at the same time, compressed fluid is admitted to the upper ends of the cylinders through the conduits 488, thereby causing the elevating cylinders to descend and deposit the tire chuck upon the beam 454. The latter then resumes its travel along the trackway and the bead setting mechanism is ready for a repetition of the cycle of operation.

Figure 27:
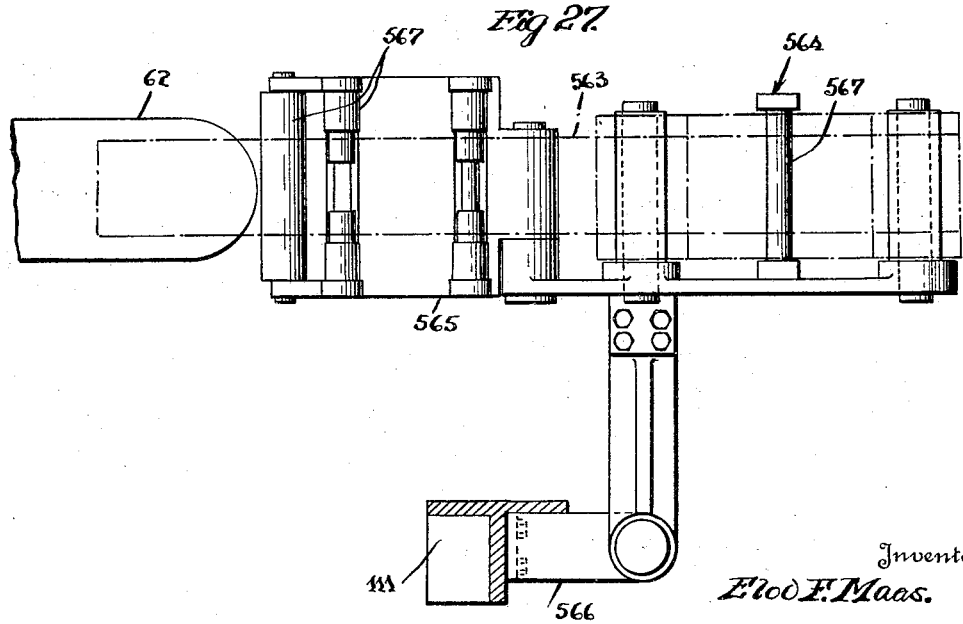
Figure 27 is a detail plan view of a breaker strip applying device.

Breaker strips 563 are applied to the tire carcasses by means of a mechanism 564 (Figures 2 and 27) that includes a tire centering and rotating device 79 similar to that shown in Figure 8. Accurate application of the strip is facilitated by means of a breaker strip guide 565, which is pivoted to a bracket 566 upon the side portion 111 of the frame 81, and is provided with a plurality of guide rollers 567. The details of construction and operation of the guide mechanism are disclosed in Patent No. 1,665,831, issued April 10, 1928 to Dayton L. Williams.

Figure 29:
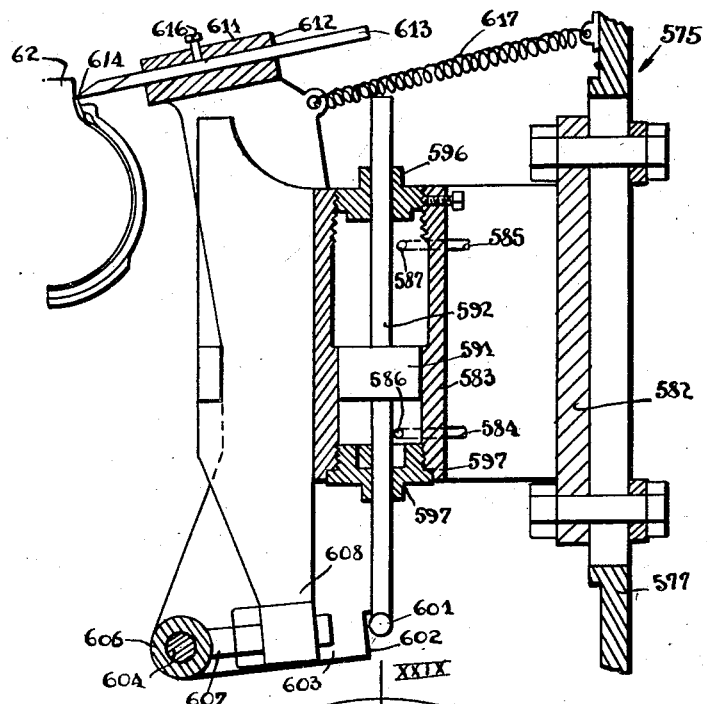
Figure 29 is a fragmentary cross-sectional view, taken substantially along the line XXIX—XXIX of Figure 28.
Figure 28:
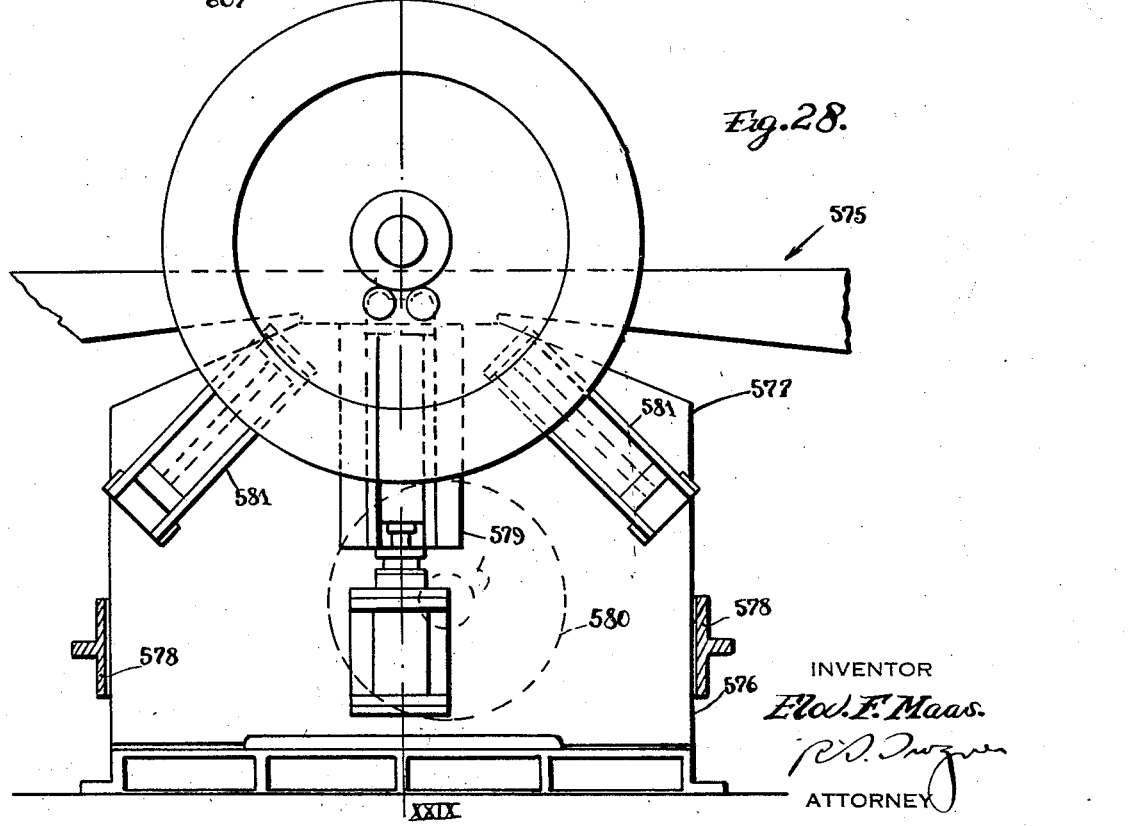
Figure 28 is a view, partially in elevation and partially in cross-section, of a device for trimming excess material from the beads of tire carcasses.

A trimming station 575 (Figures 28 and 29) for trimming excess fabric from about the beads of the tire being manufactured, includes a base or pedestal 576, having side portions 577 interconnected by means of cross bars 578. Elevating means, identical in design with the elevating means disclosed at 112 in Figure 8, is indicated at 579. The station is also equipped with means, indicated at 580, for rotating a tire core. This structure is identical with the mechanism 83 disclosed in Figure 8.

Trimming units 581, four in number, are secured to the side portions 577, the units being positioned upon each side of the elevating mechanism and being arranged at an angle with respect to the center line of the latter. Since the units are identical in construction, only one will be described in detail. Each unit comprises a bracket 582 bolted to the side member 577. The inner edge of the bracket has integrally formed thereon a fluid confining cylinder 583, whose axis is in parallel alignment with respect to the side portion 577. Conduits 584 and 585 for fluid under pressure are arranged at the ends of the cylinder and have discharge openings 586 and 587 leading into the interior of the latter.

The cylinder is provided with a reciprocable piston head 591, rigidly secured to a piston rod 592, which projects at each end through cylinder heads 596 and 597, which are screw-threaded into the ends of the cylinder. The lower extremity of the piston rod 592 is bent to form an angularly disposed foot 601 that operatively engages a notch 602 in the rear corner of a plate like swinging arm 603. The latter is pivoted on a stud shaft 64, secured in a bearing 606, formed upon the inner extremity of a bolt 607, that is screw-threaded into a vertically disposed bracket 608, rigidly secured to the exterior of the cylinder 592.

In order to attach a knife to the arm 603, the upper end thereof is formed with a head 611, which has an opening 612 extending therethrough in a direction approximately in the plane of the arm, and a knife 613 having an edge 614 is secured in the opening by means of a set screw 616.

To operate the trimming mechanism, a chuck supporting a tire carcass under construction is permitted to advance along the tracks 36 and 37 until it is disposed directly over the elevating mechanism 579. The latter is then operated to elevate the core into alignment with the core rotating mechanism, and the clutch of the latter is operated to engage the end of the shaft and rotate the core. Fluid under pressure is admitted to the cylinder 583 through the conduit 584, to elevate the piston 591, and thus operate the knife supporting arm 603 and cause the latter to swing inwardly and so bring the knife edge 614 into contact with any projecting material about the bead of the tire under construction.

When the time has been properly trimmed, fluid under pressure is admitted to the opposite end of the cylinder 583, through the conduit 585, to cause the piston 591 to descend. The knife arm is retracted to its original position by means of the tension spring 617. Finally, the elevating mechanism 579 is operated to lower the tire core to the trackway. The mechanism is then ready for a repetition of the cycle of operation.

After the beads of a tire have been trimmed, it is ready for the application of the chafing strips, an operation which may be performed at a station 619 (Figure 2). This station includes a mechanism for centering and rotating a tire chuck, identical in construction with the mechanism disclosed in Figure 8, a side portion of which is indicated at 111. In order to facilitate the rapid and accurate application of the chafing strips, a bracket 620 is secured to the side 111 of the mechanism and a breaker strip supplying device 621, shown in Figure 30, is pivotally attached thereto. The latter device is disclosed in detail in Patent No. 1,665,889, issued April 10, 1928 to Elov F. Maas, and reference may be had to that patent for a more perfect understanding of the mechanism and operation of the device.

The application of a tread element is performed by means of a unit 622 which is also similar in construction to the device disclosed in Figure 8. A bracket 623 is bolted to the upper edge of the frame 111, and a tread stretching and stitching device 624 is pivotally attached thereto. For a complete disclosure of the construction and operation of this device, reference may be had to Patent No. 1,665,889.

In order to collapse the tire chucks after the completion of a tire, a mechanism 625 (Figures 32 and 33) is provided, which includes columns 626 supporting a platform 627. The operating mechanism secured upon the platform comprises a hollow pedestal 628, provided with a rearwardly projecting portion 629, having an opening 630 formed therein. Spaced, upwardly extending brackets 631 are attached to the upper side of the platform 627 and serve as supports for a pair of parallel piston rods 632, which are mounted directly beneath the opening 630. Fluid confining cylinders 633, having longitudinally disposed racks 634 attached to the upper portions thereof, are slidably mounted upon the rods.

The racks engage gear wheels 643 and 644 formed integrally upon the outer extremities of a pair of abutting sleeves 645 and 646 that are mounted for independent rotation upon a shaft 647 which is secured in openings formed in the portion 629 and in an opening in the rear face of the pedestal 628.

The sleeves have rigidly secured thereto gear wheels 648 and 649 that engage gears 650 and 651 having faces of relatively great width. As best shown in Figure 33, the gear 651 is secured to a flange 652 of a hollow cylindrical member 653, having a rearwardly extending tubular spindle portion 654. This portion is journalled in a bearing 655 formed in an upwardly projecting bracket 656, attached to the upper face of the rearwardly projecting portion 629 of the frame 628. Rearward movement of the gear is prevented by engagement between the member 653 and the bracket 656.

A shaft 658 is keyed within the tubular portion 654 and projects forwardly through a sleeve 660, journaled within a central opening 661, formed within the gear 651. In order to secure the sleeve 660 against forward movement within the gear, a collar 662 is screw-threaded to the rear extremity of the sleeve; and to prevent rearward movement, a peripherally extending shoulder 663 is formed upon the sleeve to engage the forward face of the gear. The sleeve 660 is, also, provided adjacent its forward end with a circumferentially extending flange 664, that is bolted, as indicated at 666, to the gear 650.

A forwardly projecting portion 668 of the sleeve 660 of relatively small diameter is screw-threaded into the open rear end of a forwardly extending sleeve 669. The forward face of the gear 650 is formed with a circular recess 671, within which an annular disc 672 is rotatably mounted. The latter member is held in position by a ring 673, screw-threaded into the opening 671. The forward face of the disc 672 has an integrally formed sleeve portion 674, which is rotatably mounted upon the sleeve 669, and a second or outer sleeve 676 is screw-threaded upon the portion 674 and is locked in position by means of a set screw 677. The sleeve 676 is journaled within bearings 678 and 679, rigidly mounted upon the upper face of the pedestal 628.

Coaxial alignment of sleeves 669 and 676 is maintained by means of spacing sleeves or collars 680 and 685 positioned therebetween. The shaft 658 and the sleeves 669 and 676 have rigidly secured to their forward ends clutch sleeves 687, 689 and 691, which have internal clutch teeth 692, 693 and 694, adapted to engage with the clutch teeth 75, 76 and 77 of the shaft 53. The latter shaft is supported in alignment with the collapsing mechanism by means of the rails 36 and 37, mounted respectively upon an angle bracket 695 and an upwardly extending column 696, secured upon the forward end of the platform 627.

In order to reciprocate the shaft 658 and sleeves 669 and 676, a fluid confining cylinder 698 is secured to the side of the pedestal 628 by means of webs 699, integrally formed upon the side of the cylinder. A reciprocating piston head 705 is fitted within the cylinder 698, and has a piston rod 706 rigidly secured thereto. The latter member extends upwardly through an upper cylinder head 708, and the upper extremity of the rod is rounded to form a bearing 709 which engages a mating bearing portion 711, formed upon the extremity of an arm 712 of a bell crank lever 713. The lever is journaled upon a shaft 714, secured to an upwardly extending bracket 716, which is secured to the side of the pedestal 628. The lever 713 has downwardly extending arms 717, having a bifurcated portion 718 that engages a stud 719, rigidly secured to a split collar 720 clamped upon the tubular shaft 676.

To maintain the shaft 658 and the tubular sleeves 669 and 676 in their retracted position, a coil spring 721 is mounted upon the latter sleeve and engages at one end the bearing 679 and at the other end it engages the collar 720.

In the operation of the core collapsing mechanism, a shaft 68 of a chuck 49 is brought into axial alignment with the clutch collars 687, 689 and 691. Fluid under pressure is then admitted to the cylinder 698 to actuate the piston head 705 upwardly and thus to cause the bell crank arm 717 to swing forwardly, imparting a forward movement to the shaft 658 and the sleeves 669 and 676. The clutch teeth 692, 693 and 694 are thereby engaged with the corresponding clutch teeth 75, 76 and 77 of the core. Fluid under pressure is admitted to either of the compression cylinders 633 to cause one of the gears 650 or 651 to rotate and thus impart a rotational movement to one set of rack bars 58 and 60 or 59 and 61, depending upon which one of the cylinders is actuated. By admitting fluid to the other cylinder, the remaining set of core segments is collapsed.

After the core has been collapsed, the fluid is released from the cylinder 698 and the coil spring 721 causes the sleeves 676, 669 and the shaft 658 to be retracted to their original position, to release the core and permit it to advance along the trackway. Fluid may then be admitted to the opposite ends of the cylinders 633 to cause them to be restored to their initial position.

In order to permit the removal of tire bands from the cores after the latter have been collapsed, it will be noted that the rails of the trackway are broken, as indicated at 730 in Figure 1, and short sections of rail 731 and 732 are disposed across the gap in parallel relation with respect to each other. The space between these rails is somewhat less than the distance between the rails 36 and 37. When it is desired to remove the tire band from the chuck 49, after the core has been collapsed, the tire band is removed from the core and permitted to hang on the spindle 52 adjacent to one of the rails 36 or 37. The core is then rolled along the trackway until it is disposed upon the rails 731 and 732. Since the distance between the rails 731 and 732 is less than the distance between the rails of the trackway, the tire will now be found to be positioned outside of the rails 731 or 732 and can be removed from the shaft.

Although the various operations involved in the fabrication of the tires are performed by individual operators stationed at a plurality of separate points, the sequence of operations is identical with that performed in the manufacture of tires according to the usual methods in which a single operator performs all of the operations requisite to the assembly of the various elements embodied in the tires. The only variation in the method consists in the distribution of the various steps among a relatively large number of workmen disposed at individual stations.

Figure 31:
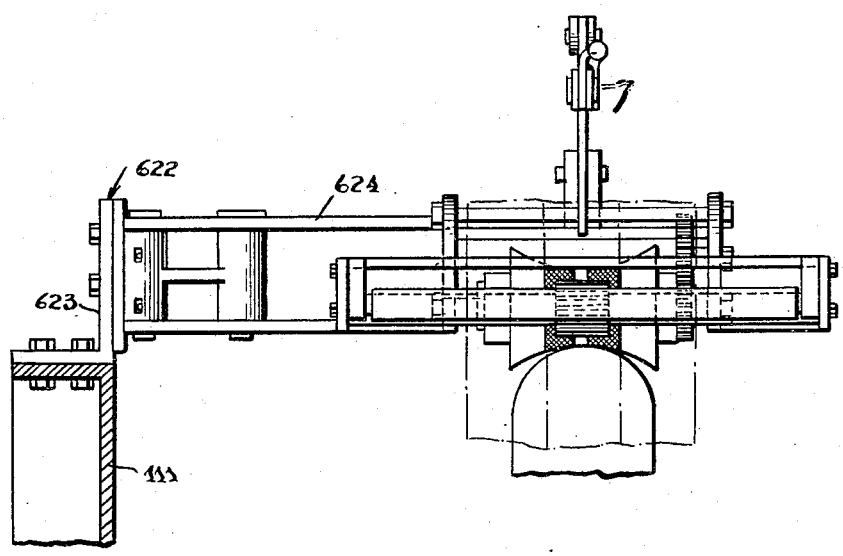
Figure 31 is a fragmentary elevational view of a device for applying tread units to tire carcasses.

Thus as shown in Figs. 1 and 2, in the manufacture of a tire, a tire core 62 is coated with cement by the device 79, after which the core is translated in succession to the stations 122, 150 and 242 at which the fabric is applied, spliced and stitched down to the core in successive steps. The beads are then applied at the station 440, after which the outer plies of fabric are applied at a station 122a in the same manner as those applied at the station 122, which operates in the same manner as station 150. Then they are spliced at the station 150a. A breaker strip is applied to the outer plies of fabric at the station 564, and the fabric and breaker strip are then stitched down simultaneously by means of a second stitching mechanism 242a, identical in construction with the mechanism indicated at 242. The plies are trimmed and loosened from the core at the station 575 in preparation for the application of the chafing strips at station 619. These strips are stitched down to the fabric by means of any convenient implement, for example, a hand operated roller which may be permitted to play upon the strips while the chuck 49 is being rotated by means of a mechanism 79a, identical in construction with the mechanism indicated at 79. It is desirable to moisten the surface of the finished carcass with benzene in order to render the surface thereof slightly tacky prior to the application of the tread element. This moistening operation may be conveniently performed while the core is being rotated by means of the mechanism 79b, which is also identical with the mechanism indicated at 79. The tread unit is applied by means of mechanism shown at 622 in Figures 2 and 31, and the ends of the unit are spliced preferably by means of devices 150b, which are identical with those disclosed at 150 in Figures 1 and 11. The tread unit is stitched down by means of devices 242b, identical with devices 242. The unit is then trimmed by means of a second set of trimming devices 575a, and finally, the chafing strips are turned under while the chuck is rotated by means of the mechanism indicated at 79c, which is identical with those employed at 79a and 79b. Upon the completion of the tires, they are removed from the core at the stations indicated at 625 and 730.

By employment of the mechanism disclosed, an operator is required to perform but a single operation upon each tire. Therefore, the number of operations with which he is required to be familiar is greatly reduced, and the period of time required to train operators is thus rendered comparatively short. Also, during the construction of the tires, no time is lost by reason of the operators being required to change from one type of mechanism to another. This distribution of the work among a relatively large number of operators thus reduces the labor costs involved in the construction of the tires.

Although I have illustrated only one form which the invention may assume, and have described that form in detail, it will be apparent to those skilled in the art that the invention is not so limited, but that various modifications may be made therein without departing from the spirit of the invention or from the scope of the appended claims.

What I claim is:

1. A machine for constructing pneumatic tires comprising a trackway, a plurality of detachable tire cores having spindles projecting therefrom and adapted to roll upon the trackway, each core being adapted to roll independently of the others, and a plurality of fabricating stations disposed at spaced intervals along the trackway, said stations being provided with means for engaging the cores and for performing various operations upon the tires being constructed upon the cores.

2. A machine for fabricating pneumatic tires comprising a plurality of inclined track sections, the higher end of one section being disposed adjacent the lower end of the preceding section, a plurality of tire chucks having projecting spindles rotatable along the track sections, means for elevating the chucks from the lower end of one section to the higher end of the succeeding section, and mechanisms disposed at spaced intervals along the track sections for performing the various operations requisite to the construction of pneumatic tires.

3. A machine for constructing pneumatic tires comprising a plurality of cores having projecting spindles, means for translating the cores independently of each other, a plurality of means for engaging and rotating the cores disposed adjacent the means for translating the cores, and stop mechanisms disposed between the second mentioned means for arresting movement of and releasing cores between two of the stations independently of the cores between the other stations.

4. A machine for fabricating pneumatic tires comprising a trackway, tire cores having projecting spindles adapted to roll upon the trackway, a plurality of fabricating stations disposed at intervals along the trackway, means at the stations for engaging the spindles and elevating them from the trackway, and means for rotating the spindles while they are elevated.

5. In combination in a machine for constructing pneumatic tires, a trackway, tire cores having projecting spindles adapted to roll upon the trackway, each of said spindles comprising an outer sleeve, an inner sleeve and an inner shaft, the inner sleeve and the inner shaft being provided with gears, rack bars engaging the gears, core sections secured to the outer extremities of the bars, devices disposed along the trackway for centering the spindles, means associated with the devices for engaging and rotating the spindles when the latter are centered, and a device for rotating the inner sleeve and the inner shaft of the spindle independently of each other to collapse the cores.

6. A machine for fabricating pneumatic tires comprising a series of tracks having their adjacent ends arranged in horizontally spaced relation, tire cores having spindles projecting therefrom, said spindles being adapted to roll upon the trackway, a rail disposed below the trackways and extending between the spaced ends thereof in position to engage the outer peripheries of the tire cores, means for engaging the upper portions of the core for holding the latter in vertical position upon the rail, and means for applying beads to tire carcasses being constructed upon the cores while the cores are maintained in vertical position.

7. A machine for constructing pneumatic tires comprising a pair of track sections having horizontally spaced ends, each of the sections comprising parallel rails, tire cores having projecting spindles rotatable along the rails of the track sections, an additional track section disposed between the first-mentioned track sections and having parallel rails which are spaced a shorter distance than the rails of the first mentioned sections, and a mechanism for collapsing the tire cores disposed adjacent the ends of one of the first mentioned sections and the intermediate sections.

8. A machine for constructing pneumatic tires comprising an endless trackway including sloping sections, the lower end of one section being disposed beneath the higher end of the succeeding section, tire cores having projecting spindles which roll upon the trackways, means for elevating the cores from one section to the succeeding section, and devices disposed in position to perform the various operations requisite to the fabrication of tires as the cores are translated along the trackway.

9. A machine for fabricating pneumatic tires comprising a plurality of sloping track sections, the lower end of one section being disposed beneath the higher end of the succeeding section, tire cores having projecting spindles rotatable along the trackways, transverse horizontally disposed shafts disposed between the adjacent ends of the trackways, radially projecting arms secured to the shafts, said arms being provided with means for engaging the spindles of the cores to translate the cores from one track section to the succeeding section, means for rotating the shaft and a plurality of mechanisms disposed at intervals along the trackway for performing the various operations requisite to the construction of the tires.

10. A machine for constructing pneumatic tires comprising spaced trackways, tire cores having projecting spindles which roll upon the trackways, a rail disposed below the trackways and adapted to engage the outer periphery of the cores to support the latter, means for engaging the upper portions of the cores in order to maintain the latter in vertical position, bead setting rings disposed in position to engage the sides of the cores to press beads thereagainst, and means for moving the rings into and out of engagement with said sides.

11. A machine for constructing pneumatic tires comprising spaced parallel rails, collapsible cores having projecting spindles adapted to roll upon the rails, vertically movable members associated with the rails, centering means secured to the upper ends of the members and adapted for engaging and centering the spindles, and means for actuating the members.

12. A machine for constructing pneumatic tires comprising spaced parallel rails, tire cores having projecting spindles for rolling upon the rails, vertically movable slides disposed adjacent the rails and having means secured to the upper ends thereof for engaging the spindles, and fluid actuated pistons connected to the slides for imparting vertical movement thereto.

13. A machine for constructing pneumatic tires comprising spaced parallel rails, tire cores having projecting spindles to roll upon the rails, vertically movable slides disposed adjacent the rails and having tire centering and journalling means secured to the upper ends thereof, means associated with the slides for imparting vertical movement thereto, and means associated with the slides for engaging the spindles to impart rotational movement thereto while the spindles are disposed upon the centering means.

14. A machine for constructing pneumatic tires comprising spaced parallel rails, tire cores having projecting spindles rotatable along the rails, elevating mechanisms associated with the rails comprising means for engaging the spindles and for lifting them from the rails, a shaft disposed in alignment with the elevating means and having a clutch device for engaging the ends of the spindles, and means for rotating the shafts.

15. A machine for constructing pneumatic tires comprising spaced parallel rails, slides disposed adjacent the rails, coacting centering rollers secured to the upper ends of the slides, pistons secured to the slides for imparting vertical movement thereto, a shaft disposed in substantial alignment with the slides, a clutch element secured to the shaft for engaging the ends of the core spindles, and means for rotating the shaft.

In witness whereof, I have hereunto signed my name.

Signed at Akron, in the county of Summit and State of Ohio, U. S. A., this 27 day of June, 1929.

ELOV F. MAAS.